United States Patent [19]

Yamaguchi et al.

[11] Patent Number: 5,468,709

[45] Date of Patent: Nov. 21, 1995

[54] CATALYSTS FOR HYDROTREATING HYDROCARBON OILS AND METHOD OF PREPARING THE SAME

[75] Inventors: Eiji Yamaguchi; Yuji Uragami, both of Ichikawa; Hideharu Yokozuka, Tokyo; Kikoo Uekusa, Chiba; Toshio Yamaguchi, Tokyo; Satoshi Abe, Niihama; Tetsuro Kamo, Ichikawa; Takao Suzuki, Tokyo, all of Japan

[73] Assignee: Sumitomo Metal Mining Co., Ltd., Tokyo, Japan

[21] Appl. No.: 154,005

[22] Filed: Nov. 18, 1993

[30] Foreign Application Priority Data

Nov. 18, 1992 [JP] Japan .................. 4-331294
Dec. 9, 1992 [JP] Japan .................. 4-351549
Nov. 15, 1993 [JP] Japan .................. 5-308760

[51] Int. Cl.$^6$ .................................................. B01J 27/18
[52] U.S. Cl. .................. 502/210; 502/211; 502/213; 502/172; 502/168; 208/216 R; 208/216 PP; 208/217; 208/251 H; 208/254 H
[58] Field of Search ........................ 502/210, 211, 502/213, 172, 168; 208/216 R, 216 PP, 217, 251 H, 254 H

[56] References Cited

U.S. PATENT DOCUMENTS

| | | | |
|---|---|---|---|
| 4,530,917 | 7/1985 | Berrebi | 502/220 |
| 4,814,315 | 3/1989 | Kukes et al. | 502/222 |
| 4,992,403 | 2/1991 | Takahashi et al. | 502/210 |
| 5,021,384 | 6/1981 | Hatano et al. | 502/209 |
| 5,162,281 | 11/1992 | Kamo et al. | 502/213 |
| 5,332,709 | 7/1994 | Nappier et al. | 502/211 |
| 5,338,717 | 8/1994 | Aldridge et al. | 502/211 |

FOREIGN PATENT DOCUMENTS

| | | | |
|---|---|---|---|
| 1-148347 | 6/1989 | Japan . | |
| 166233 | 6/1992 | Japan | 502/213 |
| 4-210240 | 7/1992 | Japan . | |

*Primary Examiner*—Anthony McFarlane
*Attorney, Agent, or Firm*—Watson, Cole, Grindle & Watson

[57] ABSTRACT

Catalysts for hydrodesulfurization and hydrodenitrogenation of hydrocarbon oils are provided which have high catalytic activity, excellent productivity and low pollution. The catalysts are made from an alumina carrier substance, at least one active metal element selected from the Group VI metals in the periodic table, at least one active metal element chosen from the Group VIII metals in the periodic table, phosphoric acid, and an additive agent. The additive agent is at least one substance selected from dihydric or trihydric alcohols having 2–10 carbon atoms per one molecule, ethers of the alcohols, monosaccharides, disaccharides, and polysaccharides. A method for preparing the catalysts is also provided and includes impregnating the alumina carrier substance with a solution mixed with a certain amount of the active metal elements, phosphoric acid and the additive agent, and drying the impregnated carrier substance at a temperature of less than 200° C.

19 Claims, No Drawings

5,468,709

CATALYSTS FOR HYDROTREATING HYDROCARBON OILS AND METHOD OF PREPARING THE SAME

FIELD OF THE INVENTION

The present invention relates to catalysts which are utilized for the desulfurization and denitrogenation of hydrocarbon oils and methods of preparing the same.

BACKGROUND OF THE INVENTION

In the conventionally well known employed hydrotreating processes for hydrocarbon oils produced from crude oils or coals, catalysts are used. The catalysts are composed of inorganic oxides, for example, alumina carrier substances carried on active metal elements including cobalt, nickel, molybdenum, tungsten, or the like. These types of catalysts are normally prepared by means of the follow consecutive processes; namely, forming alumina hydrates, sintering of $\gamma$ alumina carrier substances, impregnating them with aqueous solutions of active metal salts of cobalt, nickel, molybdenum, tungsten or the like, drying at about 100° C., and calcining the impregnated carrier substances at temperatures ranging from 400° to 600° C.

Since the carried active metal elements are formed as oxides in the above prepared catalysts for hydrotreatments, then they can not be utilized as-prepared due to relatively low catalyst activity. Hence, in order to add the activity of hydrotreating to the catalysts prior to usage, the catalysts are filled in a reactor column, through which light oils containing sulfurizing agents is purged under flowing hydrogen to conduct a presulfurization treatment in order to convert the oxides of active metal elements impregnated in catalysts to sulfides. This is followed by replacing the light oils to operating oils for the purpose of conducting normal operations.

However, it has been noticed that the conventionally prepared catalysts can not satisfactorily meet an ever-growing demand on reducing the levels of sulfur or nitrogen compounds in the heavy oils or the like from a viewpoint of environmental protection. Although, several catalysts exhibiting high activity have been previously investigated, none of these catalysts have been evaluated to be practically suitable.

For example, an improved treatment has been disclosed in the Japanese Patent Application Laid Open Tokkai-Hei No. 1-148347. However, in measuring the activity of, hydrogenating catalyst, no catalyst for desulfurization or denitrogenation was enhanced. According to the improved pretreatment, by using 0°–50° C. aqueous or organic solutions of reducing agents properly selected from a group consisting of aldehydes having 2–14 carbon atoms per one molecule, alcohol or polyhydric alcohol that contain 1–14 carbon atoms per one molecule, or organic acid or polyacids having 1–14 carbon atoms per one molecule, the catalysts which are carried with at least one type of elements from the Group VIII metals in the periodic table thereon are impregnated with said reducing agents in such a way that the reducing agent is to be impregnated at 10 ppm–100 weight %. The thus impregnated catalysts are further pressurized under 1–10 barr and heat treated at 100°–150° C. to promote the reduction reaction and dry. However, according to example 1 disclosed in the Laid Open document, it was found that the selectivity and activity of the activated catalysts of the aforementioned application were evaluated to be similar to the selectivity and activity of activated catalysts prepared by the conventional methods, and the end result is that there is no significant improvement to be noticed.

Moreover, a preparing method for highly activated catalysts for desulfurization was disclosed in U.S. Pat. No. 4,530,917. According to this patent, catalysts prepared through the conventional methods were impregnated with organic solution which was produced by dissolving organic sulfur compounds into light oil, aldehyde, ketone, polyketone, alcohol, organic acid, polyacid or the like. The thus impregnated catalysts were furtherly heated under flowing hydrogen gas to complete the activation reaction of the catalysts at relatively lower temperature region.

However, since the catalysts are calcined at 500°–550° C., which is a similar condition as a conventional method, active metal elements carried on the catalysts are in the form of oxides and this enables them to bond strongly with the carrier substances. Hence, even when the sulfurization agent is added to catalyst surfaces with the aid of an organic solvent, an improvement of the dispersibility of active metal elements in the catalysts can not be expected in spite of the fact that the activation initiation temperature can be lowered than that for the conventional method. Accordingly, the hydrotreating activity is evaluated to be of no difference from that method when the calcined catalysts are used without said organic sulfur compounds, so that in consequence hydrodesulfurization and hydrotreated denitrogenation reactions can not be promoted. No description to overcome these problems can be found in the above cited patent document.

Furthermore, the Japanese Patent Application Laid-Open Tokkai-Hei No. 4-210240 has disclosed a presulfurization method by which an $\gamma$ alumina carrier substance is impregnated with an aqueous solution of active metal salts including cobalt, nickel, molybdenum, tungsten or the like. The catalysts which were subjected to only drying are filled into a reactor column to which hydrogen gas containing hydrogen sulfide is introduced to presulfurize the catalyst at 400° C. for a certain period of time, so that the activity for the hydrocracking can be enhanced. However, the aforementioned application includes a description of only the hydrogenation and hydrocracking of the model compounds. It does not describe the method by which the ability of hydrodesulfurization or hydrodenitrogenation of hydrocarbon oils would be altered, nor what type of additives can promote the reaction by which hydrodesulfurization or hydrodenitrogenation can be achieved.

Moreover, the Japanese Patent Application Laid-Open Tokkai-Hei No. 4-166233 discloses a preparing method of the catalysts in which, after an impregnation process of active metal elements to $\gamma$ alumina carrier substance, alcoxycarboxylic acid was added to catalysts which was dried or calcined after drying, followed by drying employing temperature below 200° C. According to an example described in the aforementioned application, although the catalysts prepared by the method exhibited a higher reaction velocity constant than catalysts manufactured through the conventional method; it was only when the methoxy acetic acid is utilized as one type of alcoxycarboxylic acid did the prepared catalysts exhibit about a 2 times higher relative activity constant compared to catalysts prepared by the conventional method. However, even if the methoxyacetic acid is employed to improve the relative activity, the relative activity itself does not even reach the satisfactory level expected.

Furthermore, by a method with which the aforementioned methoxyacetic acid is utilized, both drying the $\gamma$ alumina carrier substance after being impregnated with active metal elements at 110° C. for 5 hours and drying the substance impregnated with the alcoxycarboxylic acid at 110° C. for 10 hours are absolutely necessitated, so that the reduction of the productivity of catalysts can by no means be avoided. It is prone for the carboxylic acid as one type of strong corrosive acetic acid to produce during the presulfurization process by using hydrodesulfurization catalysts prepared by the aforementioned method, causing undesired damage of equipment and consequently shorten the system life.

Furthermore, according to said Japanese Patent Application No. 4-166233, it was described that an improvement of the activity can be achieved as a result of a controlled agglomeration of the active metal element on the catalysts carrier substance by forming complex ions composed of said alcoxycarboxylic acid and active metal elements. Hence, it is suggested that the method described in the above cited patent specification is due to the formation of complex ions. Namely, alcoxycarboxylic acid plays an extremely important role in that method and is an indispensable additive. Moreover, no concrete description on hydrodenitrogenation is described in the application.

SUMMARY OF THE INVENTION

All of the foregoing have resulted in a requirement for the catalysts and the preparation method of the same of the present invention of which it is an object to provide catalysts to be used for hydrodesulfurization and hydrodenitrogenation which exhibit higher activity in conjunction with excellent productivity.

As results of continuous and diligent efforts to solve the known problems associated with conventional methods, the present inventors have found that γ alumina carrier substance was impregnated with a solution in which a solution containing active metal elements was mixed with a certain type of additives and dried at less than 200° C. thus producing catalysts for the hydrodesulfurization and hydrodenitrogenation processes to take place with these catalysts possessing higher activity than those prepared through conventional methods.

Catalysts, according to the present invention, basically consist of an alumina carrier substance, at least one kind of active metal element selected from Group VI metals in the periodic table, at least one kind of active metal element selected from the Group VIII metals in the periodic table, phosphoric acid, and additives. The catalysts for hydrotreating hydrocarbon oils are characterized by the fact that the additive is composed of one or more than two types of substances selected from a group comprising dihydric or trihydric alcohol groups having 2–10 carbon atoms per molecule, their ether groups, monosaccharide group, disaccharide group, or polysaccharide groups. Said catalysts according to the present invention have furthermore the characteristics of an alumina carrier substance impregnated with a solution which is a mixture of an active metal element, phosphoric acid, and a certain type of the additive, and is dried by a virtual temperature below 200° C.

As a structure of catalysts according to the present invention, it is preferable to utilize γ alumina carrier substance which possess 70–120 Angstrom as an average pore diameter measured by the mercury porosimetry technique, and pores within a range of average pore diameter ±10 Angstrom occupy 60% of the total volume of pores.

Active metal elements used for the impregnation process into said alumina carrier substance are molybdenum and tungsten which are preferably chosen from the Group VI metals in the periodic table; furthermore it should be emphasized that molybdenum is more preferable. Moreover metal elements chosen preferably from the Group VIII metals in the periodic table are nickel and cobalt. Furthermore, the amount of selected active metal element to the alumina carrier substance will be preferably 10–30 weight % with respect to the weight of catalyst, when the catalyst weight is converted to oxide weight for the Group VI metals; and it will be preferably 1–8 equivalent weight % with respect to catalyst weight from the Group VIII metals.

Similarly, the carrier amount of the phosphoric acid used as an impregnating solution will be preferably 1–10 % of catalysts weight when it is converted to one of oxides, namely $P_2O_5$.

As an additive to be included in the impregnation solution, dihydric or trihydric alcohol groups having 2–10 carbon atoms per one molecule will be preferably chosen, or the following compounds will also be preferably selected as their ether groups of said alcohols; namely, ethylene glycol, propylene glycol, diethylene glycol, trimethylene glycol, triethylene glycol, monobutyl ether, monomethyl ether, diethylene glycol monoethyl ether, diethylene glycol monopropyl ether, diethylene glycol monobutyl ether, glycerine, trimethylol ethane, trimethylol propane, or the like.

Similarly, sugar group to be utilized as an additive for the impregnation solution will be preferably grape sugar (glucose: $C_6H_{12}O_6$), fruit sugar (fructose: $C_6H_{12}O_6$), malt sugar (maltose: $C_{12}H_{22}O_{11}$), milk sugar (lactose: $C_{12}H_{22}O_{11}$), cane sugar (sucrose: $C_{12}H_{22}O_{11}$), or the like.

Additive amount of the aforementioned agents to the solution employed for the impregnation process will be preferably 0.05–3 fold of the total mole of the carried active metal elements for a case when said additive is ether dihydric or trihydric alcohol group having 2–10 carbon atoms per one molecule or ether groups of said alcohol genetics. For a case when the additive is selected from sugar groups, it will be preferably 0.05–1 fold of the total mole of the carried active metals.

DETAILED DESCRIPTION OF THE INVENTION

As described above, the catalysts according to the present invention is basically composed of the following: an alumina carrier substance, at least one active metal element selected from the Group VI metals in the periodic table, at least one active metal element selected from the Group VIII metals in the periodic table, phosphoric acid and a certain type of additive. The catalysts of this invention for hydrotreating hydrocarbon oils are further characterized in that said additive is either dihydric or trihydric alcohol having 2–10 carbon atoms per one molecule or one or more than two types of substances preferably selected from the group consisting of ether, monosaccharide, disaccharide or polysaccharide groups. The alumina carrier substance is furthermore impregnated by a solution containing a certain type of active metal elements, phosphoric acid, and a certain type of additive, followed by drying at a temperature which is less than 200° C.

It is already known that, in the structure of catalysts of the present invention, the following is being used: (i) alumina carrier substance is utilized as a catalyst carrier substance, (ii) at least one metal element selected from the Group VI metals in the periodic table as an active metal and at least one metal element chosen from the Group VIII metals in the periodic table as an active metal are employed, (iii) it is preferable that the amount of each selected active metal element will be 10–30% and 1–8 % of the catalysts weight once converted to oxide weight, respectively, and (iv) it is preferable that the amount of the phosphoric acid is 1–10% of the catalysts weight when converted to $P_2O_5$ weight.

Moreover, it is also prior art that (i) it is preferable to utilize molybdenum, tungsten, or the like as the Group VI metal element; it is also preferable to employ molybdenum, (ii) nickel, cobalt or the like is preferably chosen as the Group VIII metal element, (iii) the catalysts using cobalt and molybdenum exhibits high activity for hydrodesulfurization; and (iv) the catalysts using nickel and molybdenum or tungsten show high activity for hydrodenitrogenation.

The hydrotreating catalysts of the present invention are characterized in that the additive is added to a solution employed for the impregnation process of the alumina carrier substance by a certain amount of preferably selected active metal element, and phosphoric acid; said additive is preferably selected from either dihydric or trihydric alcohol groups having 2–10 carbon atoms per one molecule or one type of substances chosen from ether, monosaccharide, disaccharide, or polysaccharide groups to enhance the catalytic activities for hydrodesulfurization and hydrodenitrogenation. It is also characterized in that the hydrotreating catalysts with high catalytic activity can be easily manufactured by only drying the impregnated catalysts at a temperature of less than 200° C., so that preparation process is easy, it is guaranteed by this invention that the equipment will perform for a longer life and the present process is advantageous from the standpoint of pollution countermeasures.

It is not yet fully understood the reason why the catalytic activity is improved when the additives mentioned above are utilized in the impregnating solution during the preparation process of the catalysts. Although it might be due to the formation of complex ions, it is hardly believed that the formation of complex ions between the additives and active metal ions of an enhancement of the catalyst leads to catalytic activity since the additives employed in the present invention exhibit lower coordinate ability when compared with the aforementioned alcoxycarboxylic acid. Rather it can be speculated that, in the impregnating process of a solution containing the additives onto the alumina carrier substance, both the active metal elements and the additives are dispersed and adsorbed on the surface of fine pores in the alumina carrier substances and active metal elements and additives are fixed at their relevant sites during the subsequent drying process, so that an aggregation of active metal elements in the presulfurization process can be suppressed.

Moreover, in spite of the alumina being used as a catalyst carrier substance, any type which is conventionally utilized for manufacturing catalysts can be used. It is preferable to employ γ alumina carrier substances which have 70–120 Angstrom average pore diameter measured by the mercury porosimetry technique and pores having pore sizes within an average pore diameter ±10 Angstrom occupying more than 60% of the total pore volume of the carrier substance. The aforementioned γ alumina carrier substance can be obtained by forming a certain shape of mixing alumina hydrates which can be produced by virtue of a hydrolysis reaction of sodium aluminate and aluminum sulfate, and by firing it above 500° C. If physical conditions mentioned above for fine pores are satisfied, the shape of the carrier substance is not necessarily defined to a specific type, but it can be arbitrarily chosen to be any of a spherical, cylindrical, a trirulobe or a quadrulobe shape.

As characteristics required for the alumina carrier substance to be used for the catalysts, it is necessary that the alumina carrier substance possesses large specific area to highly disperse the active metal elements to be supported thereon and the carrier substance is an aggregated body of uniform alumina particle, and for more specificity, it is desired that fine pore of the aggregate is uniformly distributed on the entire body and in addition to achieving a uniform pore size. The γ alumina carrier substance which is utilized as a catalyst carrier substance of the present invention not only satisfies specification for fine pore as mentioned above, but also leads to high catalytic performance.

As a preferable dihydric or trihydric alcohol groups having 2–10 carbon atoms per one molecule, or their ether groups are those to be utilized as an additive for an impregnation solution. These are ethylene glycol, propylene glycol, diethylene glycol, trimethylene glycol, triethylene glycol, monobutyl ether, mono-methyl ether, monoethyl ether, diethylene glycol monopropyl ether, diethylene glycol monobutyl ether, glycerine, trimethylol ethane, trimethylol propane, or the like.

Similarly, preferable sugar groups to be utilized as an additive for an impregnation solution, will be: grape sugar (glucose: $C_6H_{12}O_6$), fruit sugar (fructose: $C_6H_{12}O_6$), malt sugar (maltose: $C_{12}H_{22}O_{11}$), milk sugar (lactose: $C_{12}H_{22}O_{11}$), cane sugar (sucrose: $C_{12}H_{22}O_{11}$), or the like. These alcohols their ethers and these sugar groups may each be used as a single substance, or can be employed as a mixture thereof.

The addition amount of these additives have been experimented and found to be in the order of 0.05–3 fold of the total mole of the supported active metal elements in the case of alcohol or its ether groups and 0.05–1 fold for the sugar groups, respectively, to exhibit the effectiveness of catalysts. If the addition amount is less than the lower limit, no sufficient effectiveness is consequently expected. On the other hand, if it exceeds the upper limit, the viscosity of the impregnation solution becomes high enough to cause difficulty for the impregnation solution to penetrate into the alumina carrier substance. The viscosity of impregnation solution principally depends upon the type of additives. Hence the optimum upper limit for addition will differ among various types of additives.

Namely, the following indicates a guideline for preferable addition amounts of additives when each additive is added individually.

| type of additives | portion with respect to total mole of active metal element |
|---|---|
| A. Alcohol or its ether | |
| ethylene glycol | 0.05–1.5 fold |
| propylene glycol | 0.05–1.0 fold |
| diethylene glycol | 0.05–1.0 fold |
| trimethylene glycol | 0.05–1.0 fold |
| triethylene glycol | 0.05–0.5 fold |
| ethylene glycol monobutyl ether | 0.05–1.0 fold |
| diethylene glycol monomethyl ether | 0.05–1.0 fold |
| diethylene glycol monomethyl ether | 0.05–1.0 fold |
| diethylene glycol monopropyl ether | 0.05–1.0 fold |
| diethylene glycol monobutyl ether | 0.05–1.0 fold |
| glycerine | 0.05–1.0 fold |
| trimethylol ethane | 0.05–1.0 fold |
| trimethylol propane | 0.05–1.0 fold |
| B. Sugar groups | |
| grape sugar | 0.05–1.0 fold |

-continued

| type of additives | portion with respect to total mole of active metal element |
|---|---|
| fruit sugar | 0.05–1.0 fold |
| malt sugar | 0.05–0.5 fold |
| milk sugar | 0.05–0.5 fold |
| cane sugar | 0.05–0.5 fold |

Since the above list provides a guideline for the addition amount when each additive is added individually, it is recommended to determine the addition amount taking account of the above list when a plurality of types of additives will be added.

According to a preparing method of catalysts of the present invention, the alumina carrier substance is impregnated with a solution containing a certain amount of active metal elements, phosphoric acid and additives and dried at a temperature which is less than 200° C. The reason for a drying at less than 200° C. is that decomposition or evaporation of adsorbed additives of pore surface of the alumina carrier substance should be prevented. Since the boiling point, melting point, and decomposition temperature of a type of additive is different from the other types, it is recommended to determine the optimum drying temperature according to the selected additive.

The following list provides information on the boiling point, melting point, and decomposition temperature of the aforementioned additives.

| type of additives | |
|---|---|
| A. Alcohol or its ether | boiling point (°C.) |
| ethylene glycol | 197 |
| propylene glycol | 188–189 |
| diethylene glycol | 245 |
| trimethylene glycol | 210–211 |
| triethylene glycol | 285 |
| ethylene glycol monobutyl ether | 171 |
| diethylene glycol monomethyl ether | 193 |
| diethylene glycol monoethyl ether | 203 |
| diethylene glycol monopropyl ether | 231 |
| glycerine | 290 |
| trimethylol ethane | 197 (melting point) |
| trimethylol propane | 295 (melting point) |
| B. Sugar groups | melting point (decomposition temperature in °C.) |
| grape sugar | 83 |
| fruit sugar | 103 (decomposition) |
| malt sugar | 102 |
| milk sugar | 202 |
| cane sugar | 160 |

The drying temperature for the catalysts is chosen in such a way that it should be high enough to remove the moisture contents if a drying is conducted in air and at the same time it should be a temperature at which the supported active metal salts are not decomposed to form oxides, hence it is preferable to be less than 200° C. Moreover, if in a vacuum or inert gas atmosphere, an optimum temperature should be high enough to remove moisture content, and low enough so that the carried supported active metal component and additives will neither evaporate nor decompose.

The thus prepared hydrotreating catalysts are filled in a reactor column and subjected to a conventional presulfurization treatment prior to practical operation. As an example of the presulfurization treatment, after the catalysts prepared through the present invention are filled in the reactor column, hydrocarbon oil containing organic sulfur compounds are passed therethrough under rising temperature and pressure while introducing hydrogen in said reactor column to achieve the presulfurization treatment. As organic sulfur compounds, sulfide groups such as dimethyl disulfide, thiol groups such as butane thiol, or the like can be employed.

EXAMPLES

In the followings, various examples will be described in great detail.
1. Examples in which alcohol group or their ether groups of the present invention are used as additives to achieve a presulfurization treatment (Example 1 through Example 7)

Example I (1) Preparation of γ alumina carrier substance

Into a 100 liter capacity stainless steel reactor with a stirrer, a mixture of 49.5 liters of a water and 204 g of 50% concentration of gluconic acid (Wako Pure Chemicals, Co, Ltd.) is filled. The reactor is heated up to 70° C. While stirring, 9,540 g of aluminum sulfate aqueous solution (8% sulfuric acid band, Shimada Shoten, Co. Ltd.) and 6,230 g of sodium aluminate aqueous solution (Sumitomo Chemical Co. Ltd.) were fed into said reactor to obtain alumina hydrate slurry which has pH of 8.8. The slurry was then aged for 30 minutes, filtered and washed to obtain alumina hydrate cakes. 5.0 kg (water content was 80%) of the alumina hydrate cake was mixed with a kneader, extruded into a cylinder having a diameter 1.5 mm by using an extruder. The extrudate was then fired at 650°, 450°, and 850° C. to obtain γ alumina carriers, each of which was designated as P, Q, and R.

In the next step, the γ alumina carrier, designated as S, was prepared under a similar process for preparing alumina carrier R except that the feeding time for aluminum sulfate and sodium aluminate aqueous solution was shortened.

The γ alumina carrier, designated as T, was made with a similar method for preparing γ alumina carrier P except that the gluconic acid was not added.

In the next step, pore diameters of γ alumina carrier substances P, Q, R, S and T were measured through the mercury porosimetry technique. Results obtained through mercury porosimetry technique on pore size are listed in Table 1 along with other pore characteristics. For calculating fine pore diameter, the next Washburn's equation was employed;

$$PD\text{-}4\delta \cos \Theta$$

where P is detected pressure in psi, D is pore diameter in Angstrom, δ is surface tension force of mercury which is 480 dyne/cm, and Θ is a contact angle between mercury and the object which is 140° C.

In Table I, the pore volume distribution (in %) indicates how much portion of the pore range will be contained in the total average pore diameter; in other words, it was obtained by dividing pore volume of each range by the total pore volume.

TABLE 1

| carrier | P | Q | R | S | T |
|---|---|---|---|---|---|
| specific surface area (cm$^2$/g) | 222 | 280 | 284 | 300 | 271 |
| average pore diameter (Å: Angstrom) | 112 | 74 | 130 | 60 | 108 |
| pore volume distribution (%) | | | | | |
| −100—−10 Å | 9 | 17 | 6 | 21 | 44 |
| −10—+10 Å | 63 | 75 | 61 | 76 | 31 |
| +10—+100 Å | 15 | 4 | 27 | 3 | 19 |
| +100—+1000 Å | 11 | 4 | 6 | 3 | 6 |

From Table 1, it is found that carrier substances P and Q meet satisfactorily all required characteristics of pore for preferable carrier substances. Although carrier substances R and S exhibit good pores volume distribution, but on the other hand they do not satisfy requirements on average pore diameter. Although the carrier subtance T shows large specific surface area, it possesses some problems with the pore volume distribution.

(2) Preparation of hydrodesulfurization catalysts

Using carriers listed in Table 1, catalysts AAA–AAI were prepared according to the conditions listed in Table 2. An impregnation solution was prepared by mixing a certain amount of molybdenum trioxide, cobalt carbonate, phosphoric acid, water, and diethylene glycol.

TABLE 2

| catalysts | carrier | cobalt carbonate (g) | 85% phosphoric acid (g) | molybdenum trioxide (g) | diethylene glycol (mol equivalent*) | liquid amount (ml) | drying temp. (°C.) | drying time (hr) | calcination temp. (°C.) | calcination time (hr) |
|---|---|---|---|---|---|---|---|---|---|---|
| AAA | P | 90 | 68 | 313 | 0.5 | 900 | 100 | 16 | — | — |
| AAB | p | 90 | 68 | 313 | 1.0 | 900 | 100 | 16 | — | — |
| AAC | Q | 90 | 68 | 313 | 0.5 | 900 | 100 | 16 | — | — |
| AAD | R | 90 | 68 | 313 | 0.5 | 900 | 100 | 16 | — | — |
| AAE | S | 90 | 68 | 313 | 0.5 | 900 | 100 | 16 | — | — |
| AAF | T | 90 | 68 | 313 | 0.5 | 900 | 100 | 16 | — | — |
| AAG | P | 90 | 68 | 313 | 0.5 | 900 | 100 | 16 | 500 | 2 |
| AAH | P | 90 | 68 | 313 | 0 | 900 | 100 | 16 | — | — |
| AAI | p | 90 | 68 | 313 | 0 | 900 | 100 | 16 | 500 | 2 |

*molar ratio of additives to total mole of active metal elements

The thus prepared solution is furtherly impregnated into 1 kg of γ alumina carrier substances as listed in Table 1, followed by drying at a temperature of 100° C. for 16 hours. In the next step, according to conditions listed in Table 2, catalysts AAG and AAI were calcined at 500° C. for 2 hours.

Catalysts AAA–AAC in Table 2 are examples of the catalysts according to the present invention, while catalysts AAD through AAH are comparisons and the catalyst AAI is a conventional type of catalyst.

(3) Presulfurization treatment

In the next step, catalysts prepared through the aforementioned conditions were filled in a flow-type reactor system and then subjected to a presulfurization treatment by using the Kuwait straight-run light gas oil (LGO) containing 1.15 weight % of sulfur and 68 ppm of nitrogen after adding 3% butane thiol as a sulfurizing agent. The presulfurization treatment was carried out according to the following conditions. No cobalt carbonyl was detected in the decomposition product which was produced during the presulfurization treatment.

(Conditions for presulfurization reactions)

reaction temperature (°C.): 316 hydrogen pressure (kg/cm$^2$G): 20 liquid space velocity of feed oil (hr$^{-1}$): 1 hydrogen/oil flow ration (Nl/l): 200 flowing time of oil (hr): 18

(4) Hydrodesulfurization tests

The catalysts were thus presulfurized according to the above (3) conditions, the hydrodesulfurization tests were conducted under the following conditions, using the same equipment employed for the presulfurization treatment, for the purpose of examining the activity of hydrodesulfurization.

(Conditions for hydrodesulfurization)

amount of catalysts (ml): 15 reaction temperature (°C.): 330 hydrogen pressure (kg/cm$^2$G): 30 liquid space velocity of feed oil (hr$^{-1}$): 2 hydrogen/oil flow ratio Nl/l): 300 flow time of oil (hr): 88

The activity obtained for the hydrodesulfurization is shown as a relative value of the rate constant, and the rate constant, $K_n$, is calculated through equation 1, provided that the hydrodesulfurization rate is proportional to the power of 1.75 of the sulfur concentration in the LGO feed oil.

Equation 1

$$K_n = LHSV \times \{1/n-1\} \times \{1/S^{n-1}\} - \{1/S_0^{n-1}\},$$

where n: 1.75.

S: sulfur concentration (%) in treated oil, $S_0$: sulfur concentration (%) in feed oil, LHSV: liquid space velocity (hr$^{-1}$).

For evaluation, the rate constant of the conventional catalysts AAI is set as 100 for a reference point to those types of catalysts. The rate constants along with the chemical compositions of each catalyst are listed in Table 3. Sulfur content was measured by the Sulfur analyzer (Horiba Co. Ltd., SLFA-920 Type). It has been found that catalysts prepared according to the present invention enhanced remarkably their activities when compared with the catalysts prepared by conventional methods.

TABLE 3

| catalysts | carrier | CoO (%) | P$_2$O$_5$ (%) | MoO$_3$ (%) | relative value of rate constant (RVA) |
|---|---|---|---|---|---|
| AAA | P | 4 | 3 | 22 | 242 |

TABLE 3-continued

| catalysts | carrier | CoO (%) | P$_2$O$_5$ (%) | MoO$_3$ (%) | relative value of rate constant (RVA) |
|---|---|---|---|---|---|
| AAB | P | 4 | 3 | 22 | 238 |
| AAC | Q | 4 | 3 | 22 | 250 |
| AAD | R | 4 | 3 | 22 | 180 |
| AAE | S | 4 | 3 | 22 | 185 |
| AAF | T | 4 | 3 | 22 | 140 |
| AAG | P | 4 | 3 | 22 | 101 |
| AAH | P | 4 | 3 | 22 | 175 |
| AAI | P | 4 | 3 | 22 | 100 |

Example 2

(1) Preparation of γ alumina carrier substance

Preparations were conducted in a similar way for example 1 and similar γ alumina substances as listed in Table 1 for example 1 were obtained.

(2) Preparation of hydrodesulfurization catalysts

Using the same γ alumina carrier substance obtained through the above (1) procedure according to Table 1, catalysts AAA'–AAI' were prepared using diethylene glycol as the selected additive agent under the conditions listed in Table 4. Catalysts AAA'–AAC' are catalysts of the present invention, while catalysts AAD' through AAH' are comparisons and catalyst AAI' is the conventional type of the catalyst.

TABLE 5

| catalysts | carrier | CoO (%) | P$_2$O$_5$ (%) | MoO$_3$ (%) | relative value of rate constant (RVA) |
|---|---|---|---|---|---|
| AAA' | P | 4 | 3 | 15 | 238 |
| AAB' | P | 4 | 3 | 15 | 235 |
| AAC' | Q | 4 | 3 | 15 | 245 |
| AAD' | R | 4 | 3 | 15 | 175 |
| AAE' | S | 4 | 3 | 15 | 180 |
| AAF' | T | 4 | 3 | 15 | 138 |
| AAG' | P | 4 | 3 | 15 | 99 |
| AAH' | P | 4 | 3 | 15 | 165 |
| AAI' | P | 4 | 3 | 15 | 100 |

Example 3

(1) Preparation of γ alumina carrier substance

The same preparation procedures were employed to yield the γ alumina carrier substances similar to those listed in Table 1 for example 1.

(2) Preparation of hydrodesulfurization catalysts

Using the similar γ alumina carrier substances as those listed in Table 1 according to the above (1) procedures, catalysts ABA–ABI were prepared using triethylene glycol as an additive agent, as shown in Table 6.

TABLE 4

| catalysts | carrier | cobalt carbonate (g) | 85% phosphoric acid (g) | molybdenum trioxide (g) | diethylene glycol (mol equivalent*) | liquid amount (ml) | drying temp. (°C.) | drying time (hr) | calcination temp. (°C.) | calcination time (hr) |
|---|---|---|---|---|---|---|---|---|---|---|
| AAA' | P | 82 | 62 | 194 | 0.5 | 900 | 100 | 16 | — | — |
| AAB' | P | 82 | 62 | 194 | 1.0 | 900 | 100 | 16 | — | — |
| AAC' | Q | 82 | 62 | 194 | 0.5 | 900 | 100 | 16 | — | — |
| AAD' | R | 82 | 62 | 194 | 0.5 | 900 | 100 | 16 | — | — |
| AAE' | S | 82 | 62 | 194 | 0.5 | 900 | 100 | 16 | — | — |
| AAF' | T | 82 | 62 | 194 | 0.5 | 900 | 100 | 16 | — | — |
| AAG' | P | 82 | 62 | 194 | 0.5 | 900 | 100 | 16 | 500 | 2 |
| AAH' | P | 82 | 62 | 194 | 0 | 900 | 100 | 16 | — | — |
| AAI' | P | 82 | 62 | 194 | 0 | 900 | 100 | 16 | 500 | 2 |

*molar ratio of additives to total mole of active metal elements (3) Presulfurization treatment Each of the catalysts obtained through the above (2) processes was presulfurized under the same procedures as previously employed for example 1. No cobalt carbonyl was detected from the decomposition product which was produced during the presulfurization reaction.

(4) Hydrodesulfurization tests

Using the presulfurized catalysts according to the above (3) procedures, each of the catalysts 1 was subjected to the hydrodesulfurization tests in a similar manner as for the example in order to examine the activity of hydrodesulfurization. Obtained results along with chemical compositions are listed in Table 5. It is found, from Table 5, that catalysts according to the present invention exhibit significant improvement in catalyst activities.

TABLE 6

| catalysts | carrier | cobalt carbonate (g) | 85% phosphoric acid (g) | molybdenum trioxide (g) | diethylene glycol (mol equivalent*) | liquid amount (ml) | drying temp. (°C.) | drying time (hr) | calcination temp. (°C.) | calcination time (hr) |
|---|---|---|---|---|---|---|---|---|---|---|
| ABA | P | 85 | 64 | 242 | 0.2 | 900 | 100 | 16 | — | — |
| ABB | P | 85 | 64 | 242 | 0.5 | 900 | 100 | 16 | — | — |
| ABC | Q | 85 | 64 | 242 | 0.5 | 900 | 100 | 16 | — | — |
| ABD | R | 85 | 64 | 242 | 0.5 | 900 | 100 | 16 | — | — |
| ABE | S | 85 | 64 | 242 | 0.5 | 900 | 100 | 16 | — | — |
| ABF | T | 85 | 64 | 242 | 0.5 | 900 | 100 | 16 | — | — |
| ABG | P | 85 | 64 | 242 | 0.5 | 900 | 100 | 16 | 500 | 2 |
| ABH | P | 85 | 64 | 242 | 0 | 900 | 100 | 16 | — | — |
| ABI | P | 85 | 64 | 242 | 0 | 900 | 100 | 16 | 500 | 2 |

*molar ratio of additives to total volume of active metal elements

In Table 6, catalysts ABA through ABC are catalysts according to the present invention, while catalysts ABD–ABH are comparisons, on the other hand the catalyst designated as ABI is the conventional type of catalyst.

(3) Presulfurization treatment

Each catalyst obtained through the above (2) process was presulfurized in a similar manner as for example 1. It was found that no cobalt carbonyl was detected from the decomposition product which was produced during the presulfurization treatment.

(4) Hydrodesulfurization tests

Using presulfurized catalysts in the above, each of the catalysts was subjected to hydrodesulfurization tests in a similar as done for example 1 to examine the catalytic activities.

TABLE 7

| catalysts | carrier | CoO (%) | $P_2O_5$ (%) | $MoO_3$ (%) | relative value of rate constant (RVA) |
|---|---|---|---|---|---|
| ABA | P | 4 | 3 | 18 | 248 |
| ABB | P | 4 | 3 | 18 | 240 |
| ABC | Q | 4 | 3 | 18 | 255 |
| ABD | R | 4 | 3 | 18 | 181 |
| ABE | S | 4 | 3 | 18 | 183 |
| ABF | T | 4 | 3 | 18 | 139 |
| ABG | P | 4 | 3 | 18 | 99 |
| ABH | P | 4 | 3 | 18 | 176 |
| ABI | P | 4 | 3 | 18 | 100 |

Table 7 represents a list of the results obtained results along with the chemical compositions. From Table 7, it was found that catalysts according to the present invention exhibit excellent improvement in catalyst activities.

Example 4

(1) Preparation of γ alumina carrier substance

Using the same preparation procedures as for example 1, the γ alumina carrier substances were produced which are similar to those listed in Table 1 for example 1.

(2) Preparation of the hydrodesulfurization catalysts

Using γ alumina carrier substances obtained through the above (1) processes, catalysts ACA–ACI were prepared under the same conditions listed in Table 6 except that ethylene glycol was utilized as the selected additive agent. Catalysts from ACA to ACC are catalysts according to the present invention, while the catalysts ACD–ACH are comparisons and the catalyst designated as ACI is the conventional type of catalyst.

(3) Presulfurization treatment

Each of the catalysts prepared through the above (2) was subjected to presulfurization treatment in a similar manner as those done for example 1. No cobalt carbonyl was detected from the decomposition product which was produced during the presulfurization treatments.

(4) Hydrodesulfurization tests

Using presulfurized catalysts according to the above (3) process, each catalyst was subjected to the hydrodesulfurization tests in a similar manner as done for example 1 to examine the activity of hydrodesulfurization. Results obtained and chemical compositions are listed in Table 8. From Table 8, it is found that the catalytic activity has shown a remarkable improvement with catalysts of the present invention when compared with catalysts of the conventional types.

TABLE 8

| catalysts | carrier | CoO (%) | $P_2O_5$ (%) | $MoO_3$ (%) | relative value of rate constant (RVA) |
|---|---|---|---|---|---|
| ACA | P | 4 | 3 | 18 | 230 |
| ACB | P | 4 | 3 | 18 | 225 |
| ACC | Q | 4 | 3 | 18 | 235 |
| ACD | R | 4 | 3 | 18 | 175 |
| ACE | S | 4 | 3 | 18 | 182 |
| ACF | T | 4 | 3 | 18 | 138 |
| ACG | P | 4 | 3 | 18 | 101 |
| ACH | P | 4 | 3 | 18 | 174 |
| ACI | P | 4 | 3 | 18 | 100 |

Example 5

(1) Preparation of γ alumina carrier substances

Under similar procedures as employed previously for example 1, γ alumina carrier substances were prepared which have similar characteristics to those listed in Table 1 for example 1.

(2) Preparation of the hydrodesulfurization catalyst

Using γ alumina carrier substances prepared in the above (1) procedures similar to Table 1, catalysts ADA–ADI were prepared using glycerine as an additive, as listed in Table 9. Catalysts ADA–ADC are of the present invention, while catalysts ADD–ADH are comparisons and the catalysts catalyst designated as ADI is the conventional type of catalyst.

TABLE 9

| catalysts | carrier | cobalt carbonate (g) | 85% phosphoric acid (g) | molybdenum trioxide (g) | diethylene glycol (mol equivalent*) | liquid amount (ml) | drying temp. (°C.) | drying time (hr) | calcination temp. (°C.) | calcination time (hr) |
|---|---|---|---|---|---|---|---|---|---|---|
| ADA | P | 85 | 64 | 242 | 0.1 | 900 | 100 | 16 | — | — |
| ADB | P | 85 | 64 | 242 | 0.5 | 900 | 100 | 16 | — | — |
| ADC | Q | 85 | 64 | 242 | 0.5 | 900 | 100 | 16 | — | — |
| ADD | R | 85 | 64 | 242 | 0.5 | 900 | 100 | 16 | — | — |
| ADE | S | 85 | 64 | 242 | 0.5 | 900 | 100 | 16 | — | — |
| ADF | T | 85 | 64 | 242 | 0.5 | 900 | 100 | 16 | — | — |
| ADG | P | 85 | 64 | 242 | 0.5 | 900 | 100 | 16 | 500 | 2 |
| ADH | P | 85 | 64 | 242 | 0 | 900 | 100 | 16 | — | — |
| ADI | P | 85 | 64 | 242 | 0 | 900 | 100 | 16 | 500 | 2 |

*molar ratio of additives to total volume of active metal elements (3) Presulfurization treatment Presulfurization treatments were performed in a similar manner as for example 1. It was found that no cobalt carbonyl was detected from the decomposition product which was produced during the presulfurization treatment.

(4) Hydrodesulfurization tests

Using catalysts presulfurized according to the above (3) procedures, each catalyst was subjected to hydrodesulfurization tests in a similar manner as done for example 1 in order to examine the activity of hydrodesulfurization. Results obtained along with chemical compositions are listed in Table 10. It was found that catalysts according to the present invention exhibit significant enhancement of catalytic activities.

TABLE 10

| catalysts | carrier | CoO (%) | $P_2O_5$ (%) | $MoO_3$ (%) | relative value of rate constant (RVA) |
|---|---|---|---|---|---|
| ADA | P | 4 | 3 | 18 | 228 |
| ADB | P | 4 | 3 | 18 | 225 |
| ADC | Q | 4 | 3 | 18 | 237 |
| ADD | R | 4 | 3 | 18 | 165 |
| ADE | S | 4 | 3 | 18 | 166 |
| ADF | T | 4 | 3 | 18 | 125 |
| ADG | P | 4 | 3 | 18 | 100 |
| ADH | P | 4 | 3 | 18 | 165 |
| ADI | P | 4 | 3 | 18 | 100 |

Example 6

(1) Preparation of γ alumina carrier substances

Similarly to example 1, γ alumina carrier substances which have similar characteristics as those listed in Table 1 for example 1 were prepared.

(2) Preparation of the hydrodesulfurization catalysts

Using γ carrier substances prepared through the above (1) procedures, catalysts AEA–AEI were prepared under similar conditions as for Table 9 except that diethylene glycol monoethyl ether was used as an additive agent. Catalysts AEA–AEC represent the invention, AED–AEH are comparisons and the catalyst designated as AEI is the conventional type of catalyst.

(3) Presulfurization treatment

Presulfurization treatments were performed under similar manners done for example 1. No cobalt carbonyl was detected from the decomposition product.

TABLE 11

| catalysts | carrier | CoO (%) | $P_2O_5$ (%) | $MoO_3$ (%) | relative value of rate constant (RVA) |
|---|---|---|---|---|---|
| AEA | P | 4 | 3 | 18 | 232 |
| AEB | P | 4 | 3 | 18 | 227 |
| AEC | Q | 4 | 3 | 18 | 241 |
| AED | R | 4 | 3 | 18 | 168 |
| AEE | S | 4 | 3 | 18 | 171 |
| AEF | T | 4 | 3 | 18 | 131 |
| AEG | P | 4 | 3 | 18 | 100 |
| AEH | P | 4 | 3 | 18 | 173 |
| AEI | P | 4 | 3 | 18 | 100 |

(4) Hydrodesulfurization tests

Using the presulfurized catalysts through the above (3) process, similar hydrodesulfurization tests as those of example 1 were conducted to examine the activity for hydrodesulfurization. Results obtained and chemical compositions are listed in Table 11. It was found that the catalysts according to the present invention exhibit remarkable improvement in catalytic activities.

Example 7

(1) Preparation of γ alumina carrier substances

Similarly to example 1, γ alumina carrier substances with the same characteristics as listed in Table 1 for example 1 were prepared.

(2) Preparation of the hydrodesulfurization catalysts

Using γ alumina carrier substances prepared through the above (1) similar to Table 1, catalysts AFA–AFI were prepared according to conditions listed in Table 9 except that diethylene glycol mono butyl ether was used as an additive agent. Catalysts AFA–AFC are present invention, AFC–AFH are comparisons, and AFI is the conventional type of catalysts.

(3) Presulfurization treatments

Presulfurization treatments were performed on each catalyst conditioned through the above (2) procedures. No cobalt carbonyl was detected from the decomposition product which was produced during the presulfurization treatment.

(4) Hydrodesulfurization tests

Using the catalysts presulfurized through the above (3) processes, hydrodesulfurization tests were performed in a similar manner as for example 1 to examine the catalytic activity of the hydrodesulfurization. Results along with the chemical compositions are listed in Table 12. It was found that catalysts according to the present invention exhibit significant improvement in catalytic activities when compared to the catalysts prepared by the conventional methods.

TABLE 12

| catalysts | carrier | CoO (%) | $P_2O_5$ (%) | $MoO_3$ (%) | relative value of rate constant (RVA) |
|---|---|---|---|---|---|
| AFA | P | 4 | 3 | 18 | 236 |
| AFB | P | 4 | 3 | 18 | 231 |
| AYC | Q | 4 | 3 | 18 | 247 |
| AFD | R | 4 | 3 | 18 | 171 |
| AFE | S | 4 | 3 | 18 | 175 |
| AFF | T | 4 | 3 | 18 | 136 |
| AFG | P | 4 | 3 | 18 | 102 |
| AFH | P | 4 | 3 | 18 | 178 |
| AFI | P | 4 | 3 | 18 | 100 |

2. Examples for hydrodenitrogenation catalysts when alcohol or their ether groups of the present invention are used as an additive (Example 8–Example 14)

Example 8

(1) Preparation of γ alumina carrier substances

Similar γ alumina carrier substances were prepared according to Table 1 for example 1.

(2) Preparation of the hydrodenitrogenation catalysts

Using 1 kg of γ alumina carrier substances prepared through the above (1) procedures, catalysts BAA–BAI were prepared according to conditions listed in Table 13 using diethylene glycol as an additive agent. Catalysts BAA–BAC are catalysts according to the present invention, BAD–BAH are comparisons and BAI is the conventional type of catalysts.

TABLE 13

| catalysts | carrier | cobalt carbonate (g) | 85% phosphoric acid (g) | molybdenum trioxide (g) | diethylene glycol (mol equivalent*) | liquid amount (ml) | drying temp. (°C.) | drying time (hr) | calcination temp. (°C.) | calcination time (hr) |
|---|---|---|---|---|---|---|---|---|---|---|
| BAA | P | 112 | 141 | 327 | 0.5 | 900 | 100 | 16 | — | — |
| BAB | P | 112 | 141 | 327 | 1.0 | 900 | 100 | 16 | — | — |
| BAC | Q | 112 | 141 | 327 | 0.5 | 900 | 100 | 16 | — | — |
| BAD | R | 112 | 141 | 327 | 0.5 | 900 | 100 | 16 | — | — |
| BAE | S | 112 | 141 | 327 | 0.5 | 910 | 100 | 16 | — | — |
| BAF | T | 112 | 141 | 327 | 0.5 | 950 | 100 | 16 | — | — |
| BAG | P | 112 | 141 | 327 | 0.5 | 960 | 100 | 16 | 500 | 2 |
| BAH | P | 112 | 141 | 327 | 0 | 900 | 100 | 16 | — | — |
| BAI | P | 112 | 141 | 327 | 0 | 900 | 100 | 16 | 500 | 2 |

* molar ratio of additives to total mole of active metal elements (3) Presulfurization treatment Catalysts obtained from the above (2) process, each catalyst was presulfurized similarly to example 1. No nickel carbonyl was detected from the decomposition product which was produced during the presulfurization treatment.

(4) Hydrodenitrogenation tests

Catalysts prepared through the above (3) procedures were subjected to hydrodenitrogenation tests using the same equipment utilized for the presulfurization treatment in order to examine the catalytic activity of hydrodenitrogenation. Testing conditions were as follows;

(conditions for hydrodenitrogenation)
catalysts amount (ml): 15
reaction temperature (°C.): 330
hydrogen pressure (kg/cm²G): 30
liquid space velocity of feed oil (hr⁻¹): 2
hydrogen/oil flow ratio (Nl/l): 300
flow time of oil (hr): 88

The rate constant was obtained from nitrogen content in the treated oil. The activity for the hydrodenitrogenation was indicated by the relative value of the rate constant. Nitrogen content in the treated oil was analyzed by the Nitrogen analyzer (Mitsubishi Kasei Co. Ltd., TN-05 Type). The rate constant is expressed as a pseudo first order reaction rate constant and is calculated by the equation 2. The rate constant for the conventional catalyst BAI was set to be 100 as a reference point for other types of catalysts.

equation 2

$$k_{1st} = LHSV \times ln(N_o/N),$$

$N_o$ : nitrogen content in feed oil (ppm), $N$: nitrogen content in treated oil (ppm), and LHSV: liquid space velocity (hr⁻¹).

Results of the obtained activity for hydrodenitrogenation are listed in Table 14. From Table 14, it is found that catalysts according to the present invention improve significantly the catalytic activities when compared to the activities of conventional types of catalysts.

TABLE 14

| catalysts | carrier | CoO (%) | $P_2O_5$ (%) | $MoO_3$ (%) | relative value of rate constant (RVA) |
|---|---|---|---|---|---|
| BAA | P | 4 | 6 | 22 | 201 |
| BAB | P | 4 | 6 | 22 | 195 |

TABLE 14-continued

| catalysts | carrier | CoO (%) | $P_2O_5$ (%) | $MoO_3$ (%) | relative value of rate constant (RVA) |
|---|---|---|---|---|---|
| BAC | Q | 4 | 6 | 22 | 210 |
| BAD | R | 4 | 6 | 22 | 150 |
| BAE | S | 4 | 6 | 22 | 155 |
| BAF | T | 4 | 6 | 22 | 130 |
| BAG | P | 4 | 6 | 22 | 99 |
| BAH | P | 4 | 6 | 22 | 145 |
| BAI | P | 4 | 6 | 22 | 100 |

Example 9

(1) Preparation of γ alumina carrier substances

The γ alumina carrier substances were prepared under similar procedures as for example 1, listed in Table 1.

(2) Preparation of the hydrodenitrogenation catalysts

Similar γ alumina carrier substances as those obtained before and having characteristics listed in Table 1 according to the above (1) procedures were used, in catalysts BAA'–BAI' were prepared under the conditions listed in Table 15 using diethylene glycol as an additive agent. Catalysts BAA'–BAC' are catalysts according to the present invention. BAD'–BAH' are comparisons while the catalyst designated as BAI' is the conventional catalyst.

TABLE 16

| catalysts | carrier | CoO (%) | P$_2$O$_5$ (%) | MoO$_3$ (%) | relative value of rate constant (RVA) |
|---|---|---|---|---|---|
| BAA' | P | 4 | 6 | 15 | 196 |
| BAB' | P | 4 | 6 | 15 | 193 |
| BAC' | Q | 4 | 6 | 15 | 203 |
| BAD' | R | 4 | 6 | 15 | 145 |

TABLE 15

| catalysts | carrier | cobalt carbonate (g) | 85% phosphoric acid (g) | molybdenum trioxide (g) | diethylene glycol (mol equivalent*) | liquid amount (ml) | drying temp. (°C.) | drying time (hr) | calcination temp. (°C.) | calcination time (hr) |
|---|---|---|---|---|---|---|---|---|---|---|
| BBA' | P | 101 | 128 | 202 | 0.5 | 900 | 100 | 16 | — | — |
| BBB' | P | 101 | 128 | 202 | 1.0 | 900 | 100 | 16 | — | — |
| BBC' | Q | 101 | 128 | 202 | 0.5 | 900 | 100 | 16 | — | — |
| BBD' | R | 101 | 128 | 202 | 0.5 | 900 | 100 | 16 | — | — |
| BBE' | S | 101 | 128 | 202 | 0.5 | 910 | 100 | 16 | — | — |
| BBF' | T | 101 | 128 | 202 | 0.5 | 950 | 100 | 16 | — | — |
| BBG' | P | 101 | 128 | 202 | 0.5 | 960 | 100 | 16 | 500 | 2 |
| BBH' | P | 101 | 128 | 202 | 0 | 900 | 100 | 16 | — | — |
| BBI' | P | 101 | 128 | 202 | 0 | 900 | 100 | 16 | 500 | 2 |

*molar ratio of additives to total mole of active metal elements (3) Presulfurization treatment Similarly to example 1, catalysts were obtained through the above (2) procedures. Each of the catalysts was subjected to presulfurization treatment. No nickel carbonyl was detected from the decomposition product which was produced during the presulfurization treatment.

(4) Hydrodenitrogenation tests

Using the catalysts presulfurized by the above (3) process, the hydrodenitrogenation tests similar to example 8 were conducted to examine the catalytic activity of the hydrogenation. Results and chemical compositions are listed in Table 16. It was found that the present catalysts exhibit a remarkable enhancement in terms of catalytic activity.

TABLE 16-continued

| catalysts | carrier | CoO (%) | P$_2$O$_5$ (%) | MoO$_3$ (%) | relative value of rate constant (RVA) |
|---|---|---|---|---|---|
| BAE' | S | 4 | 6 | 15 | 150 |
| BAF' | T | 4 | 6 | 15 | 127 |
| BAG' | P | 4 | 6 | 16 | 101 |
| BAH' | P | 4 | 6 | 15 | 130 |
| BAI' | P | 4 | 6 | 15 | 100 |

Example 10

(1) Preparation of γ alumina carrier substances

The γ alumina carrier substances were prepared under similar procedures as employed in example 1 with similar characteristics listed in Table 1.

(2) Preparation of the hydrodenitrogenation catalysts

Using the γ alumina carrier substances obtained from the above (1) process, catalysts BBA–BBI were prepared under the conditions listed in Table 17, using triethylene glycol as an additive agent.

TABLE 17

| catalysts | carrier | cobalt carbonate (g) | 85% phosphoric acid (g) | molybdenum trioxide (g) | diethylene glycol (mol equivalent*) | liquid amount (ml) | drying temp. (°C.) | drying time (hr) | calcination temp. (°C.) | calcination time (hr) |
|---|---|---|---|---|---|---|---|---|---|---|
| BBA | P | 106 | 133 | 253 | 0.2 | 900 | 100 | 16 | — | — |
| BBB | P | 106 | 133 | 253 | 0.5 | 900 | 100 | 16 | — | — |
| BBC | Q | 106 | 133 | 253 | 0.5 | 900 | 100 | 16 | — | — |
| BBD | R | 106 | 133 | 253 | 0.5 | 900 | 100 | 16 | — | — |
| BBE | S | 106 | 133 | 253 | 0.5 | 910 | 100 | 16 | — | — |
| BBF | T | 106 | 133 | 253 | 0.5 | 950 | 100 | 16 | — | — |
| BBG | P | 106 | 133 | 253 | 0.5 | 960 | 100 | 16 | 500 | 2 |
| BBH | P | 106 | 133 | 253 | 0 | 900 | 100 | 16 | — | — |
| BBI | P | 106 | 133 | 253 | 0 | 900 | 100 | 16 | 500 | 2 |

*molar ratio of additives to total mole of active metal elements

In Table 17, catalysts BBA–BBC are the catalysts according to the present invention, BBD–BBH are comparisons, and the catalyst designated as BBI is the conventional type.

(3) Presulfurization treatment

Similarly to example 1, each of the catalysts prepared by the above (2) procedures is subjected to hydrodenitrogenation tests under the same procedures as for example 8 to examine the catalytic activities of the hydrodenitrogenation. Results with chemical compositions are listed in Table 18. From Table 18, it is found that the present catalysts improve remarkably the catalytic activities.

TABLE 18

| catalysts | carrier | CoO (%) | $P_2O_5$ (%) | $MoO_3$ (%) | relative value of rate constant (RVA) |
|---|---|---|---|---|---|
| BBA | P | 4 | 6 | 18 | 211 |
| BBB | P | 4 | 6 | 18 | 193 |
| BBC | Q | 4 | 6 | 18 | 209 |
| BBD | R | 4 | 6 | 18 | 149 |
| BBE | S | 4 | 6 | 18 | 156 |
| BBF | T | 4 | 6 | 18 | 132 |
| BBG | P | 4 | 6 | 18 | 102 |
| BBH | P | 4 | 6 | 18 | 147 |
| BBI | P | 4 | 6 | 18 | 100 |

Example 11

(1) Preparation of γ alumina carrier substances

The γ alumina carrier substances are prepared under similar procedures as those for example 1 having same characteristics as listed in Table 1.

(2) Preparation of the hydrodenitrogenation catalysts

Using γ alumina carrier substances prepared through the above (1) process, catalysts BCA–BCI were prepared under similar manner as listed in Table 14, except that ethylene glycol was employed as an additive agent.

TABLE 18

| catalysts | carrier | CoO (%) | $P_2O_5$ (%) | $MoO_3$ (%) | relative value of rate constant (RVA) |
|---|---|---|---|---|---|
| BCA | P | 4 | 6 | 18 | 190 |
| BCB | P | 4 | 6 | 18 | 188 |
| BCC | Q | 4 | 6 | 18 | 195 |
| BCD | R | 4 | 6 | 18 | 148 |
| BCE | S | 4 | 6 | 18 | 152 |
| BCF | T | 4 | 6 | 18 | 128 |
| BCG | P | 4 | 6 | 18 | 101 |
| BCH | P | 4 | 6 | 18 | 143 |
| BCI | P | 4 | 6 | 18 | 100 |

In Table 19, catalysts BCA–BCC represent catalysts according to the present invention, BCD–BCH are comparisons, and the catalyst designated as BCI is the conventional type.

(3) Presulfurization treatment

Each of the catalysts listed in Table 19 was subjected to the presulfurization treatment according to a similar procedure as in example 1. No nickel carbonyl was detected from the decomposition which was produced during the presulfurization treatment.

(4) Hydrodenitrogenation tests

The presulfurized catalysts obtained through the above (3) procedures were subjected to the hydrodenitrogenation tests under a similar manner as for example 8 to examine the catalytic activity. Results along with the chemical compositions are listed in Table 19. It was found that the catalysts according to the present invention enhanced the catalytic activities.

Example 12

(1) Preparation of γ alumina carrier substances

The γ alumina carrier substances were prepared according to the same procedures for example 1 having the similar characteristics.

(2) Preparation of the hydrodenitrogenation catalysts

Using the γ alumina carrier substances prepared by the above (1) procedures which are similar to Table 1, catalysts BDA–BDI were prepared under the conditions listed in Table 20 using glycerine as an additive agent. Catalysts BDA–BDC are catalysts according to the present invention, BDD–BDH are comparisons, and the catalyst designated as BDI is the conventional type of catalyst.

(3) Presulfurization treatment

Similar presulfurization treatments were applied to each catalyst prepared through the above (2) step. No nickel carbonyl was detected from the decomposition product which was produced during the presulfurization treatment.

TABLE 20

| catalysts | carrier | nickel carbonate (g) | 85% phosphoric acid (g) | molybdenum trioxide (g) | diethylene glycol (mol equivalent*) | liquid amount (ml) | drying | | calcination | |
|---|---|---|---|---|---|---|---|---|---|---|
| | | | | | | | temp. (°C.) | time (hr) | temp. (°C.) | time (hr) |
| BDA | P | 106 | 133 | 253 | 0.1 | 900 | 100 | 16 | — | — |
| BDB | P | 106 | 133 | 253 | 0.5 | 900 | 100 | 16 | — | — |
| BDC | Q | 106 | 133 | 253 | 0.5 | 900 | 100 | 16 | — | — |
| BDD | R | 106 | 133 | 253 | 0.5 | 900 | 100 | 16 | — | — |
| BDE | S | 106 | 133 | 253 | 0.5 | 910 | 100 | 16 | — | — |
| BDF | T | 106 | 133 | 253 | 0.5 | 950 | 100 | 16 | — | — |
| BDG | P | 106 | 133 | 253 | 0.5 | 960 | 100 | 16 | 500 | 2 |
| BDH | P | 106 | 133 | 253 | 0 | 900 | 100 | 16 | — | — |
| BDI | P | 106 | 133 | 253 | 0 | 900 | 100 | 16 | 500 | 2 |

*: molar ratio of additives to total mole of active metal elements (4) Hydrodenitrogenation tests Using the presulfurized catalysts through the process (3), each catalyst was subjected to the hydrodenitrogenation tests under a similar manner as example 8 to examine the catalytic activities. Results and chemical compositions are listed in Table 21. It was found, from Table 21, that the catalysts according to the present invention improve the catalytic activity significantly.

TABLE 21

| catalysts | carrier | NiO (%) | $P_2O_5$ (%) | $MoO_3$ (%) | relative value of rate constant (RVA) |
|---|---|---|---|---|---|
| BDA | P | 4 | 6 | 18 | 194 |
| BDB | P | 4 | 6 | 18 | 187 |
| BDC | Q | 4 | 6 | 18 | 200 |
| BDD | R | 4 | 6 | 18 | 143 |
| BDE | S | 4 | 6 | 18 | 148 |
| BDF | T | 4 | 6 | 18 | 123 |
| BDG | P | 4 | 6 | 18 | 99 |
| BDH | P | 4 | 6 | 18 | 135 |
| BDI | P | 4 | 6 | 18 | 100 |

Example 13

(1) Preparation of γ alumina carrier substances

The γ alumina carrier substances were prepared under a similar manner as in example 1 having the same characteristics as listed in Table 1.

(2) preparation of the hydrodenitrogenation catalysts

Using the γ alumina prepared through the above (1) procedures, catalysts BEA–BEI were prepared under similar conditions as listed in Table 20 except that diethylene glycol monoethyl ether was used as an additive agent. Catalysts BEA–BEC are catalysts according to the present invention, BED–BEH are comparisons, and the catalyst designated as BEI is the conventional type of catalyst, as listed in Table 22.

TABLE 22

| catalysts | carrier | NiO (%) | $P_2O_5$ (%) | $MoO_3$ (%) | relative value of rate constant (RVA) |
|---|---|---|---|---|---|
| BEA | P | 4 | 6 | 18 | 196 |
| BEB | P | 4 | 6 | 18 | 187 |
| BEC | Q | 4 | 6 | 18 | 202 |
| BED | R | 4 | 6 | 18 | 146 |
| BEE | S | 4 | 6 | 18 | 149 |
| BEF | T | 4 | 6 | 18 | 125 |
| BEG | P | 4 | 6 | 18 | 100 |
| BEH | P | 4 | 6 | 18 | 136 |
| BEI | P | 4 | 6 | 18 | 100 |

(3) Presulfurization treatment

Each catalyst obtained through the above (2) process was subjected to presulfurization treatments. No nickel carbonyl was detected from the decomposition product during the presulfurization treatment.

(4) Hydrodenitrogenation tests

Using presulfurized catalysts, each catalyst was subjected to the hydrodenitrogenation tests under similar procedures as in example 8 to examine the catalytic activities. As seen in Table 22, it was found that the catalysts according to the present invention enhance the catalytic activities significantly.

Example 14

(1) Preparation of γ alumina carrier substances

The γ alumina carrier substances were prepared according to similar procedures as example 1.

(2) Preparation of the hydrodenitrogenation catalysts

Using the γ carrier substances having similar characteristics as listed in Table 1, catalysts BFA–BFI were prepared under the similar conditions as listed in Table 20 except that diethylene glycol monobutyl ether was employed as an additive agent. In Table 23, catalysts BFA–BFC are catalysts according to the present invention, BFC–BFH are comparisons, and the catalyst designated as BFI is the conventional type.

(3) Presulfurization treatment

Each catalyst was presulfurized according to the same procedures as in example 1. No nickel carbonyl was detected from the decomposition product during the presulfurization treatment.

(4) Hydrodenitrogenation tests

Using the presulfurized catalysts through the above (3) procedures, each of the catalysts was subjected to the hydrodenitrogenation tests under similar manner as in example 8 to examine the catalytic activities. Results along with the chemical compositions are listed in Table 23. It was found that the catalysts according to the present invention exhibit significant improvements in the catalytic activities.

TABLE 23

| catalysts | carrier | NiO (%) | $P_2O_5$ (%) | $MoO_3$ (%) | relative value of rate constant (RVA) |
|---|---|---|---|---|---|
| BFA | P | 4 | 6 | 18 | 198 |
| BFB | P | 4 | 6 | 18 | 191 |
| BFC | Q | 4 | 6 | 18 | 205 |
| BFD | R | 4 | 6 | 18 | 147 |
| BFE | S | 4 | 6 | 18 | 152 |
| BFF | T | 4 | 6 | 18 | 127 |
| BFG | P | 4 | 6 | 18 | 101 |
| BFH | P | 4 | 6 | 18 | 139 |
| BFI | P | 4 | 6 | 18 | 100 |

3. Examples in which hydrodesulfurization is performed when alcohol or ether groups are utilized within addition amount defined in the present invention with respect to the supported active metal elements (Example 15–Example 19)

Example 15

(1) Preparation of the hydrodesulfurization catalysts

Using 1 kg of the aforementioned γ alumina carrier substance P, catalysts CAA–CAR were prepared using diethylene glycol or triethylene glycol as an additive agent, under similar procedures as in example 1, see Table 24.

In Table 24, catalysts CAB–CAG, and CAJ–CAO are catalysts according to the present invention, CAA, CAH, CAI, CAP, and CAQ are comparisons, and the one designated as CAR is the conventional type of catalyst.

TABLE 24

| catalysts | cobalt carbonate (g) | 85% phosphoric acid (g) | molybdenum trioxide (g) | diethylene glycol (mol equivalent*) | triethylene glycol (mol equivalent*) | liquid amount (ml) | drying temp. (°C.) | drying time (hr) | calcination temp. (°C.) | calcination time (hr) |
|---|---|---|---|---|---|---|---|---|---|---|
| CAA | 85 | 64 | 242 | 0 | 0 | 900 | 100 | 16 | — | — |
| CAB | 85 | 64 | 242 | 0.05 | 0 | 900 | 100 | 16 | — | — |
| CAC | 85 | 64 | 242 | 0.2 | 0 | 900 | 100 | 16 | — | — |
| CAD | 85 | 64 | 242 | 0.5 | 0 | 900 | 100 | 16 | — | — |
| CAE | 85 | 64 | 242 | 1.0 | 0 | 910 | 100 | 16 | — | — |
| CAF | 85 | 64 | 242 | 1.5 | 0 | 910 | 100 | 16 | — | — |
| CAG | 85 | 64 | 242 | 3.0 | 0 | 920 | 100 | 16 | — | — |
| CAH | 85 | 64 | 242 | 3.5 | 0 | 920 | 100 | 16 | — | — |
| CAI | 85 | 64 | 242 | 0.5 | 0 | 900 | 100 | 16 | 500 | 2 |
| CAJ | 85 | 64 | 242 | 0 | 0.05 | 900 | 100 | 16 | — | — |
| CAK | 85 | 64 | 242 | 0 | 0.2 | 900 | 100 | 16 | — | — |
| CAL | 85 | 64 | 242 | 0 | 0.3 | 900 | 100 | 16 | — | — |
| CAM | 85 | 64 | 242 | 0 | 0.5 | 900 | 100 | 16 | — | — |
| CAN | 85 | 64 | 242 | 0 | 1.0 | 910 | 100 | 16 | — | — |
| CAO | 85 | 64 | 242 | 0 | 3.0 | 920 | 100 | 16 | — | — |
| CAP | 85 | 64 | 242 | 0 | 3.5 | 920 | 100 | 16 | — | — |
| CAQ | 85 | 64 | 242 | 0 | 0.5 | 900 | 100 | 16 | 500 | 2 |
| CAR | 85 | 64 | 242 | 0 | 0 | 900 | 100 | 16 | 500 | 2 |

*: molar ratio of additives to total mole of active metal elements (2) Presulfurization treatments Each catalyst prepared in the above (1) procedure was presulfurized as in example 1. No cobalt carbonyl was detected in the decomposition product during the presulfurization treatments.

(3) Hydrodesulfurization tests

Using catalysts presulfurized according to the above (2) process, catalysts were subjected to the hydrodesulfurization tests under a similar procedure as in example 1 to examine the catalytic activities. Results along with chemical compositions are listed in Table 25. From Table 25, it was found that the catalysts according to the present invention show significant enhancement in catalytic activities.

TABLE 25

| Catalysts | CoO (%) | $P_2O_5$ (%) | $MoO_3$ (%) | relative value of rate constant (RVA) |
|---|---|---|---|---|
| CAA | 4 | 3 | 18 | 181 |
| CAB | 4 | 3 | 18 | 228 |
| CAC | 4 | 3 | 18 | 243 |
| CAD | 4 | 3 | 18 | 240 |
| CAE | 4 | 3 | 18 | 234 |
| CAF | 4 | 3 | 18 | 239 |
| CAG | 4 | 3 | 18 | 217 |
| CAH | 4 | 3 | 18 | 180 |
| CAI | 4 | 3 | 18 | 101 |
| CAJ | 4 | 3 | 18 | 231 |
| CAK | 4 | 3 | 18 | 247 |
| CAL | 4 | 3 | 18 | 243 |
| CAM | 4 | 3 | 18 | 232 |
| CAN | 4 | 3 | 18 | 237 |
| CAO | 4 | 3 | 18 | 231 |
| CAP | 4 | 3 | 18 | 181 |
| CAQ | 4 | 3 | 18 | 99 |

TABLE 25-continued

| Catalysts | CoO (%) | $P_2O_5$ (%) | $MoO_3$ (%) | relative value of rate constant (RVA) |
|---|---|---|---|---|
| CAR | 4 | 3 | 18 | 100 |

Example 16

(1) Preparation of the hydrodesulfurization catalysts

Using ethylene glycol as an additive agent, catalysts CBA–CBG were prepared under similar procedures as in example 15 except with the conditions listed in Table 26. In Table 26, catalysts CBB–CBE are catalysts according to the present invention, CBA and CBF are comparisons, and the one designated as CBG is the conventional type of catalyst.

TABLE 26

| Catalysts | Cobalt Carbonate (g) | 85% Phosphoric Acid (g) | Molybdenum Trioxide (g) | Ethylene Glycol (mol equivalent*) | Liquid Amount (ml) | DRYING Temp. (°C.) | DRYING Time (hr) | CALCINATION Temp. (°C.) | CALCINATION Time (hr) |
|---|---|---|---|---|---|---|---|---|---|
| CBA | 85 | 64 | 242 | 0.0 | 900 | 100 | 16 | — | — |

TABLE 26-continued

| Catalysts | Cobalt Carbonate (g) | 85% Phosphoric Acid (g) | Molybdenum Trioxide (g) | Ethylene Glycol (mol equivalent*) | Liquid Amount (ml) | DRYING Temp. (°C.) | DRYING Time (hr) | CALCINATION Temp. (°C.) | CALCINATION Time (hr) |
|---|---|---|---|---|---|---|---|---|---|
| CBB | 85 | 64 | 242 | 0.05 | 900 | 100 | 16 | — | — |
| CBC | 85 | 64 | 242 | 0.2 | 900 | 100 | 16 | — | — |
| CBD | 85 | 64 | 242 | 0.5 | 900 | 100 | 16 | — | — |
| CBE | 85 | 64 | 242 | 1.5 | 910 | 100 | 16 | — | — |
| CBF | 85 | 64 | 242 | 0.5 | 900 | 100 | 16 | 500 | 2 |
| CBG | 85 | 64 | 242 | 0.0 | 900 | 100 | 16 | 500 | 2 |

*: molar ratio of additives to total mole of active metal elements (2) Presulfurization treatment Each of the catalysts prepared according to the above (1) was presulfurized as in example 1. No cobalt carbonyl was detected from the decomposition product during the presulfurization treatment.

(3) Hydrodesulfurization tests

Using catalysts presulfurized through the above (2) process, each catalyst was subjected to the above hydrodesulfurization tests under a similar procedure for example 1 to investigate the catalytic activity. Results and chemical compositions are listed in Table 27. From Table 27, it is found that catalysts within the defined range according to the present invention exhibit remarkable improvement in the catalytic activities.

TABLE 27

| Catalysts | CoO (%) | $P_2O_5$ (%) | $MoO_3$ (%) | relative value of rate constant (RVA) |
|---|---|---|---|---|
| CBA | 4 | 3 | 18 | 178 |
| CBB | 4 | 3 | 18 | 228 |
| CBC | 4 | 3 | 18 | 233 |
| CBD | 4 | 3 | 18 | 231 |
| CBE | 4 | 3 | 18 | 223 |
| CBF | 4 | 3 | 18 | 99 |
| CBG | 4 | 3 | 18 | 100 |

Example 17

(1) Preparation of the hydrodesulfurization catalysts

Using diethylene glycol monobutyl ether as an additive agent, catalysts CCA–CCG were prepared with a similar procedure as example 16 except that 1.5 mole equivalent is changed to 1.0 mole equivalent. Catalysts CCB–CCE are catalysts according to the present invention, CCA and CCF are comparisons, and the one designated as CCG is the conventional type of catalyst.

(2) Presulfurization treatment

Catalysts obtained through the above (1) process are presulfurized under a similar manner as in example 1. No cobalt carbonyl was detected from the decomposition product during the presulfurization treatment.

(3) Hydrodesulfurization tests

Using the presulfurized catalysts prepared through the above (2) procedure, each catalyst was subjected to the hydrodesulfurization tests under a similar manner as in example 1 to examine the catalytic activities. Obtained results along with the chemical compositions are listed in Table 28. It was found, from Table 28, that the catalysts within the present invention exhibit significant enhancement in catalytic activities.

TABLE 28

| Catalysts | CoO (%) | $P_2O_5$ (%) | $MoO_3$ (%) | relative value of rate constant (RVA) |
|---|---|---|---|---|
| CCA | 4 | 3 | 18 | 181 |
| CCB | 4 | 3 | 18 | 219 |
| CCC | 4 | 3 | 18 | 238 |
| CCD | 4 | 3 | 18 | 230 |
| CCE | 4 | 3 | 18 | 225 |
| CCF | 4 | 3 | 18 | 100 |
| CCG | 4 | 3 | 18 | 100 |

Example 18

(1) Preparation of the hydrodesulfurization catalysts

Catalysts CDA–CDG were prepared under a similar manner as in example 17 except that diethylene glycol monoethyl ether was employed as an additive agent. Catalysts CDB–CDE are catalysts according to the present invention, CDA and CDF are comparisons, and the one designated as CCG is the conventional catalyst.

(2) Presulfurization treatment

Each catalyst was presulfurized in a similar manner as example 1. No cobalt carbonyl was detected in the decomposition product during the presulfurization treatment.

(3) Hydrodesulfurization tests

Using presulfurized catalysts, each catalyst was subjected to the hydrodesulfurization tests under a similar manner as in example 1 to examine the catalytic activities. Results are listed in Table 29 along with chemical compositions. From Table 29, it was found that the catalysts according to the present invention show remarkable improvements in catalytic activities.

TABLE 29

| Catalysts | CoO (%) | $P_2O_5$ (%) | $MoO_3$ (%) | relative value of rate constant (RVA) |
|---|---|---|---|---|
| CDA | 4 | 3 | 18 | 177 |
| CDB | 4 | 3 | 18 | 213 |
| CDC | 4 | 3 | 18 | 235 |
| CDD | 4 | 3 | 18 | 225 |
| CDE | 4 | 3 | 18 | 212 |
| CDF | 4 | 3 | 18 | 101 |
| CDG | 4 | 3 | 18 | 100 |

Example 19

(1) Preparation of the hydrodesulfurization catalysts

Catalysts CEA–CEG were prepared under a similar method as example 17 except that glycerine was utilized as an additive agent. Catalysts CEB–CEE are catalysts according to the present invention, CEA and CEF are comparisons, and the one designated as CEG is the conventional type of catalyst.

(2) Presulfurization treatment

Catalysts were presulfurized under a similar manner as example 1. No cobalt carbonyl was detected from the decomposition product.

(3) Hydrodesulfurization tests

Using presulfurized catalysts, each catalyst was subjected to the hydrodesulfurization tests under a similar way as in example 1 to examine the catalytic activities. Results and chemical compositions are listed in Table 30. It was found (3) Hydrodenitrogenation tests Using the catalysts presulfurized in the above (2) procedure, each catalyst was subjected to hydrodenitrogenation tests under a similar manner as in example 8 to investigate the catalytic activities. The obtained results and chemical compositions are listed in Table 32. From Table 32, it is found that the catalysts according to the present invention enhance the catalytic activities remarkably.

TABLE 31

| catalysts | nickel carbonate (g) | 85% phosphoric acid (g) | molybdenum trioxide (g) | diethylene glycol (mol equivalent*) | triethylene glycol (mol equivalent*) | liquid amount (ml) | drying temp. (°C.) | drying time (hr) | calcination temp. (°C.) | calcination time (hr) |
|---|---|---|---|---|---|---|---|---|---|---|
| DAA | 106 | 133 | 253 | 0 | 0 | 900 | 100 | 16 | — | — |
| DAB | 106 | 133 | 253 | 0.05 | 0 | 900 | 100 | 16 | — | — |
| DAC | 106 | 133 | 253 | 0.2 | 0 | 900 | 100 | 16 | — | — |
| DAD | 106 | 133 | 253 | 0.5 | 0 | 900 | 100 | 16 | — | — |
| DAE | 106 | 133 | 253 | 1.0 | 0 | 910 | 100 | 16 | — | — |
| DAF | 106 | 133 | 253 | 3.0 | 0 | 920 | 100 | 16 | — | — |
| DAG | 106 | 133 | 253 | 3.5 | 0 | 920 | 100 | 16 | — | — |
| DAH | 106 | 133 | 253 | 0.5 | 0 | 900 | 100 | 16 | 500 | 2 |
| DAI | 106 | 133 | 253 | 0 | 0.05 | 900 | 100 | 16 | — | — |
| DAJ | 106 | 133 | 253 | 0 | 0.2 | 900 | 100 | 16 | — | — |
| DAK | 106 | 133 | 253 | 0 | 0.3 | 900 | 100 | 16 | — | — |
| DAL | 106 | 133 | 253 | 0 | 0.5 | 900 | 100 | 16 | — | — |
| DAM | 106 | 133 | 253 | 0 | 1.0 | 910 | 100 | 16 | — | — |
| DAN | 106 | 133 | 253 | 0 | 3.5 | 920 | 100 | 16 | — | — |
| DAO | 106 | 133 | 253 | 0 | 0.5 | 900 | 100 | 16 | 500 | 2 |
| DAP | 106 | 133 | 253 | 0 | 0 | 900 | 100 | 16 | 500 | 2 |

*: molar ratio of additives to total mole of active metal elements that the catalysts according to the present invention show significant improvements in the catalytic activities.

TABLE 30

| Catalysts | CoO (%) | $P_2O_5$ (%) | $MoO_3$ (%) | relative value of rate constant (RVA) |
|---|---|---|---|---|
| CEA | 4 | 3 | 18 | 178 |
| CEB | 4 | 3 | 18 | 210 |
| CEC | 4 | 3 | 18 | 230 |
| CED | 4 | 3 | 18 | 225 |
| CEE | 4 | 3 | 18 | 212 |
| CEF | 4 | 3 | 18 | 101 |
| CEG | 4 | 3 | 18 | 100 |

4. Examples in which the hydrodenitrogenation is performed when alcohol or ether within a range defined in the present invention is utilized (Example 20–Example 24)

Example 20

(1) Preparation of the hydrodenitrogenation catalysts

Using the aforementioned carrier substance P, catalysts DAA–DAP were prepared under a similar manner as in example 1 with conditions listed in Table 31 by using diethylene glycol or triethylene glycol as an additive agent.

In Table 31, catalysts DAB–DAF, and DAI–DAM are catalysts according to the present invention, DAA, DAG, DAH, DAN and DAO are comparisons, and the one designated as DAP is the conventional type of catalyst.

(2) Presulfurization treatment

Each catalyst was presulfurized according to a similar manner in example 1. No nickel carbonyl was detected from the decomposition product which is produced during the presulfurization treatment.

TABLE 32

| Catalysts | NiO (%) | $P_2O_5$ (%) | $MoO_3$ (%) | relative value of rate constant (RVA) |
|---|---|---|---|---|
| DAA | 4 | 6 | 18 | 150 |
| DAB | 4 | 6 | 18 | 183 |
| DAC | 4 | 6 | 18 | 202 |
| DAD | 4 | 6 | 18 | 197 |
| DAE | 4 | 6 | 18 | 192 |
| DAF | 4 | 6 | 18 | 164 |
| DAG | 4 | 6 | 18 | 149 |
| DAH | 4 | 6 | 18 | 102 |
| DAI | 4 | 6 | 18 | 183 |
| DAJ | 4 | 6 | 18 | 210 |
| DAK | 4 | 6 | 18 | 205 |
| DAL | 4 | 6 | 18 | 194 |
| DAM | 4 | 6 | 18 | 171 |
| DAN | 4 | 6 | 18 | 149 |
| DAO | 4 | 6 | 18 | 98 |
| DAP | 4 | 6 | 18 | 100 |

Example 21

(1) Preparation of the hydrodenitrogenation catalysts

Using the ethylene glycol as an additive agent, catalysts DBA–DBG were prepared under a similar manner as in example 20 and under the conditions are listed in Table 33. Catalysts DBB–DBE are catalysts according to the present invention, DBA and DBF are comparisons while the one designated as DBG is the conventional type of catalyst.

TABLE 33

| catalysts | nickel carbonate (g) | 85% phosphoric acid (g) | molybdenum trioxide (g) | ethylene glycol (mol equivalent*) | liquid amount (ml) | drying temp. (°C.) | drying time (hr) | calcination temp. (°C.) | calcination time (hr) |
|---|---|---|---|---|---|---|---|---|---|
| DBA | 106 | 133 | 253 | 0.0 | 900 | 100 | 16 | — | — |
| DBB | 106 | 133 | 253 | 0.05 | 900 | 100 | 16 | — | — |
| DBC | 106 | 133 | 253 | 0.2 | 900 | 100 | 16 | — | — |
| DBD | 106 | 133 | 253 | 0.5 | 900 | 100 | 16 | — | — |
| DBE | 106 | 133 | 253 | 1.5 | 910 | 100 | 16 | — | — |
| DBF | 106 | 133 | 253 | 0.5 | 900 | 100 | 16 | 500 | 2 |
| DBG | 106 | 133 | 253 | 0.0 | 900 | 100 | 16 | 500 | 2 |

*: molar ratio of additives to total mole of active metal elements (2) Presulfurization treatment Each catalyst was presulfurized according to the similar manner as in example 1. No nickel carbonyl was detected from the decomposition product during the presulfurization treatment.

(3) Hydrodenitrogenation tests

Using presulfurized catalysts through the above (2) procedures, each catalyst was subjected to the hydrodenitrogenation tests under a similar procedure as in example 8 to evaluate the catalytic activities. The obtained data and chemical compositions are listed in Table 34. It was found that the catalysts according to the present invention exhibit great improvements in catalytic activities compared with conventional types of catalysts.

TABLE 34

| Catalysts | NiO (%) | $P_2O_5$ (%) | $MoO_3$ (%) | relative value of rate constant (RVA) |
|---|---|---|---|---|
| DBA | 4 | 6 | 18 | 147 |
| DBB | 4 | 6 | 18 | 171 |
| DBC | 4 | 6 | 18 | 192 |
| DBD | 4 | 6 | 18 | 189 |
| DBE | 4 | 6 | 18 | 187 |
| DBF | 4 | 6 | 18 | 101 |
| DBG | 4 | 6 | 18 | 100 |

Example 22

(1) Preparation of the hydrodenitrogenation catalysts

Using diethylene glycol monobutyl ether as an additive agent, catalysts DCA–DCG were prepared under a similar procedure as example 20 except that 1.5 mol equivalent was changed to be only 1.0 mole equivalent. Catalysts DCA–DCE are catalysts according to the present invention, DCA and DCF are comparisons and the one designated as DCG is the conventional type of catalyst.

(2) Presulfurization treatment

Using catalysts prepared with the above (1) procedure, each catalyst was presulfurized as in example 1. No nickel carbonyl was detected in the decomposition product during the presulfurization treatment.

(2) Hydrodenitrogenation tests

Using presulfurized catalysts, each catalyst was subjected to the hydrodenitrogenation tests under a similar manner as in example 8 to examine the catalytic activities. Obtained data along with chemical compositions are listed in Table 35. From Table 35, it is found that the catalysts according to the present invention show remarkable enhancement in catalytic activities.

TABLE 35

| Catalysts | NiO (%) | $P_2O_5$ (%) | $MoO_3$ (%) | relative value of rate constant (RVA) |
|---|---|---|---|---|
| DCA | 4 | 6 | 18 | 149 |
| DCB | 4 | 6 | 18 | 179 |
| DCC | 4 | 6 | 18 | 196 |
| DCD | 4 | 6 | 18 | 185 |
| DCE | 4 | 6 | 18 | 182 |
| DCF | 4 | 6 | 18 | 101 |
| DCG | 4 | 6 | 18 | 100 |

Example 23

(1) Preparation of the hydrodenitrogenation catalysts

Using diethylene glycol monoethyl ether as an additive agent, catalysts DAA–DDG were prepared through a similar manner as in example 22. Catalysts DDB–DDE are catalysts according to the present invention, DDA and DDF are comparisons, and the one designated as DDG is the conventional type of catalyst.

TABLE 36

| Catalysts | NiO (%) | $P_2O_5$ (%) | $MoO_3$ (%) | relative value of rate constant (RVA) |
|---|---|---|---|---|
| DDA | 4 | 6 | 18 | 151 |
| DDB | 4 | 6 | 18 | 182 |
| DDC | 4 | 6 | 18 | 195 |
| DDD | 4 | 6 | 18 | 189 |
| DDE | 4 | 6 | 18 | 182 |
| DDF | 4 | 6 | 18 | 102 |
| DDG | 4 | 6 | 18 | 100 |

(2) Presulfurization treatment

Each catalyst was presulfurized according to the similar method as in example 1. No nickel carbonyl was detected from the decomposition product during the presulfurization treatment.

(3) Hydrodenitrogenation tests

Using the presulfurized catalysts, each catalyst was subjected to the hydrodenitrogenation tests conducted under a similar manner as in example 8 to evaluate the catalytic activities. The obtained results and chemical compositions are listed in Table 36. It is found that the catalysts according to the present invention demonstrate great improvement in catalytic activities.

Example 24

(1) Preparation of the hydrodenitrogenation catalysts

Using the glycerine as an additive agent, catalysts DEA–DEC were prepared under a similar manner as in example 22. Catalysts DEB–DEE are catalysts according to the present invention. DEA and DEF are comparisons, and the one designated as DEG is the conventional type of catalyst.

TABLE 37

| Catalysts | NiO (%) | P$_2$O$_5$ (%) | MoO$_3$ (%) | relative value of rate constant (RVA) |
|---|---|---|---|---|
| DEA | 4 | 6 | 18 | 149 |
| DEB | 4 | 6 | 18 | 178 |
| DEC | 4 | 6 | 18 | 197 |
| DED | 4 | 6 | 18 | 190 |
| DEE | 4 | 6 | 18 | 185 |
| DEF | 4 | 6 | 18 | 102 |
| DEG | 4 | 6 | 18 | 100 |

(2) Presulfurization treatment

Using the prepared catalysts under the above (1) procedure, each catalyst was presulfurized under a similar method as for example 1. No nickel carbonyl was detected from the decomposition product during the presulfurization treatment.

(3) Hydrodenitrogenation tests

Using presulfurized catalysts, each catalyst was subjected to the hydrodenitrogenation tests under a similar manner as done for the example 8 to examine the catalytic activity. The obtained data and chemical compositions are listed in Table 37. It is found that the catalysts according to the present invention show remarkable improvement in the catalytic activities.

5. Examples in which the hydrodesulfurization is performed when the sugar groups are utilized as an additive agent (Example 25–Example 27)

Example 25

(1) Preparation of γ alumina carrier substances

Similarly as in example 1, the γ alumina carrier substances were prepared.

(2) Preparation of the hydrodesulfurization catalysts

Using the γ alumina carrier substances prepared in the above (1) process, catalysts EAA–EAI were prepared under conditions listed in Table 38 using grape sugar as an additive agent. Catalysts EAA–EAC are catalysts according to the present invention EAD–EAH are comparisons, and the one designated as EAI is the conventional type of the catalyst.

(3) Presulfurization treatment

Each catalyst prepared in the above (2) procedure was presulfurized in a similar manner as in example 1. No cobalt carbonyl was detected from the decomposition product during the presulfurization treatment.

(4) Hydrodesulfurization tests

Using presulfurized catalysts, each catalyst was subjected to the hydrodesulfurization tests in a similar manner as example 1 to evaluate the catalyst activity. The obtained data along with the chemical compositions are listed in Table 39. From Table 39, it is found that the catalysts prepared through the present invention exhibit significant improvement in catalytic activities.

TABLE 39

| catalysts | carrier | CoO (%) | P$_2$O$_5$ (%) | MoO$_3$ (%) | relative value of rate constant (RVA) |
|---|---|---|---|---|---|
| EAA | P | 4 | 3 | 18 | 223 |
| EAB | P | 4 | 3 | 18 | 218 |
| EAC | Q | 4 | 3 | 18 | 234 |
| EAD | R | 4 | 3 | 18 | 162 |
| EAE | S | 4 | 3 | 18 | 164 |
| EAF | T | 4 | 3 | 18 | 124 |
| EAG | P | 4 | 3 | 18 | 100 |
| EAH | P | 4 | 3 | 18 | 165 |
| EAI | P | 4 | 3 | 18 | 100 |

Example 26

(1) Preparation of the γ alumina carrier substances

Similarly as example 1, the γ alumina carrier substances were prepared.

(2) Preparation of the hydrodesulfurization catalysts

Using prepared γ alumina carrier substances through the above (1) procedure, catalysts EBA–EBI were prepared under conditions listed in Table 40 using malt sugar as an additive agent. Catalysts EBA–EBC are catalysts according to the present invention. EBD–EBH are comparisons, and the one designated as EBI is the conventional type of catalyst.

TABLE 38

| catalysts | carrier | cobalt carbonate (g) | 85% phosphoric acid (g) | molybdenum trioxide (g) | grape sugar (mol equivalent*) | liquid amount (ml) | drying temp. (°C.) | drying time (hr) | calcination temp. (°C.) | calcination time (hr) |
|---|---|---|---|---|---|---|---|---|---|---|
| EAA | P | 85 | 64 | 242 | 0.1 | 900 | 100 | 16 | — | — |
| EAB | P | 85 | 64 | 242 | 0.5 | 900 | 100 | 16 | — | — |
| EAC | Q | 85 | 64 | 242 | 0.5 | 900 | 100 | 16 | — | — |
| EAD | R | 85 | 64 | 242 | 0.5 | 900 | 100 | 16 | — | — |
| EAE | S | 85 | 64 | 242 | 0.5 | 900 | 100 | 16 | — | — |
| EAF | T | 85 | 64 | 242 | 0.5 | 900 | 100 | 16 | — | — |
| EAG | P | 85 | 64 | 242 | 0.5 | 900 | 100 | 16 | 500 | 2 |
| EAH | P | 85 | 64 | 242 | 0 | 900 | 100 | 16 | — | — |
| EAI | P | 85 | 64 | 242 | 0 | 900 | 100 | 16 | 500 | 2 |

*: molar ratio of additives to total mole of active metal elements

TABLE 40

| catalysts | carrier | cobalt carbonate (g) | 85% phosphoric acid (g) | molybdenum trioxide (g) | malt sugar (mol equivalent*) | liquid amount (ml) | drying temp. (°C.) | drying time (hr) | calcination temp. (°C.) | calcination time (hr) |
|---|---|---|---|---|---|---|---|---|---|---|
| EBA | P | 85 | 64 | 242 | 0.1 | 900 | 100 | 16 | — | — |
| EBB | P | 85 | 64 | 242 | 0.5 | 900 | 100 | 16 | — | — |
| EBC | Q | 85 | 64 | 242 | 0.5 | 900 | 100 | 16 | — | — |
| EBD | R | 85 | 64 | 242 | 0.5 | 900 | 100 | 16 | — | — |
| EBE | S | 85 | 64 | 242 | 0.5 | 900 | 100 | 16 | — | — |
| EBF | T | 85 | 64 | 242 | 0.5 | 900 | 100 | 16 | — | — |
| EBG | P | 85 | 64 | 242 | 0.5 | 900 | 100 | 16 | 500 | 2 |
| EBH | P | 85 | 64 | 242 | 0 | 900 | 100 | 16 | — | — |
| EBI | P | 85 | 64 | 242 | 0 | 900 | 100 | 16 | 500 | 2 |

*: molar ratio of additives to total mole of active metal elements (3) Presulfurization treatments Using prepared catalysts through the step (2) in above, each catalyst was presulfurized in a similar manner as in example 1. No cobalt carbonyl was detected from the decomposition product during the presulfurization treatment.

(4) Hydrodesulfurization tests

Using presulfurized catalysts, each catalyst was subjected to the hydrodesulfurization tests to evaluate the catalytic activities. The results obtained from the hydrodesulfurization tests are listed in Table 41 along with chemical compositions. It is found that the catalysts according to the present invention show great enhancement in catalytic activities.

TABLE 41

| catalysts | carrier | CoO (%) | $P_2O_5$ (%) | $MoO_3$ (%) | relative value of rate constant (RVA) |
|---|---|---|---|---|---|
| EBA | P | 4 | 3 | 18 | 221 |
| EBB | P | 4 | 3 | 18 | 216 |
| EBC | Q | 4 | 3 | 18 | 232 |
| EBD | R | 4 | 3 | 18 | 158 |
| EBE | S | 4 | 3 | 18 | 162 |
| EBF | T | 4 | 3 | 18 | 123 |
| EBG | P | 4 | 3 | 18 | 100 |
| EBH | P | 4 | 3 | 18 | 164 |
| EBI | P | 4 | 3 | 18 | 100 |

Example 27

(1) Preparation of the γ alumina carrier substances

The γ alumina carrier substances were prepared following a similar method as the one employed for example 1, showing the same characteristics as listed in Table 1.

(2) Preparation of the hydrodesulfurization catalysts.

Using the γ alumina carrier substances, catalysts ECA–ECI were prepared under conditions listed in Table 42 using the milk sugar as an additive agent. Catalysts ECA–ECC are catalysts according to the present invention. ECD–ECH are comparisons and the one designated as ECI is the conventional type of catalyst.

TABLE 42

| catalysts | carrier | cobalt carbonate (g) | 85% phosphoric acid (g) | molybdenum trioxide (g) | milk sugar (mol equivalent*) | liquid amount (ml) | drying temp. (°C.) | drying time (hr) | calcination temp. (°C.) | calcination time (hr) |
|---|---|---|---|---|---|---|---|---|---|---|
| ECA | P | 85 | 64 | 242 | 0.1 | 900 | 100 | 16 | — | — |
| ECB | P | 85 | 64 | 242 | 0.5 | 900 | 100 | 16 | — | — |
| ECC | Q | 85 | 64 | 242 | 0.5 | 900 | 100 | 16 | — | — |
| ECD | R | 85 | 64 | 242 | 0.5 | 900 | 100 | 16 | — | — |
| ECE | S | 85 | 64 | 242 | 0.5 | 900 | 100 | 16 | — | — |
| ECF | T | 85 | 64 | 242 | 0.5 | 900 | 100 | 16 | — | — |
| ECG | P | 85 | 64 | 242 | 0.5 | 900 | 100 | 16 | 500 | 2 |
| ECH | P | 85 | 64 | 242 | 0 | 900 | 100 | 16 | — | — |
| ECI | P | 85 | 64 | 242 | 0 | 900 | 100 | 16 | 500 | 2 |

*: molar ratio of additives to total mole of active metal elements (3) Presulfurization treatments Following the similar procedures as in example 1, each catalyst was presulfurized. No cobalt carbonyl was detected from the decomposition product during the presulfurization treatment.

(4) Hydrodesulfurization tests

Using presulfurized catalysts through the step (3) in above, each catalyst was subjected to the hydrodesulfurization tests to evaluate the catalytic activity. The obtained results and chemical compositions are listed in Table 43. From Table 43, it is found that the catalysts according to the present invention exhibit significant improvement in catalytic activities.

TABLE 43

| catalysts | carrier | CoO (%) | $P_2O_5$ (%) | $MoO_3$ (%) | relative value of rate constant (RVA) |
|---|---|---|---|---|---|
| ECA | P | 4 | 3 | 18 | 222 |
| ECB | P | 4 | 3 | 18 | 218 |
| ECC | Q | 4 | 3 | 18 | 234 |

TABLE 43-continued

| catalysts | carrier | CoO (%) | P₂O₅ (%) | MoO₃ (%) | relative value of rate constant (RVA) |
|---|---|---|---|---|---|
| ECD | R | 4 | 3 | 18 | 160 |
| ECE | S | 4 | 3 | 18 | 161 |
| ECF | T | 4 | 3 | 18 | 124 |
| ECG | P | 4 | 3 | 18 | 100 |
| ECH | P | 4 | 3 | 18 | 167 |
| ECI | P | 4 | 3 | 18 | 100 |

6. Examples in which the hydrodenitrogenation is carried out when a sugar group is utilized as an additive agent according to the present invention (Example 28–Example 33)

Example 28

(1) Preparation of the γ alumina carrier substances

According to the similar procedures followed previously for example 1, the γ alumina carrier substances were prepared.

(2) Preparation of the hydrodenitrogenation catalysts

Using the γ alumina carrier substances, catalysts FAA–FAI were prepared under the conditions listed in Table 44. Catalysts FAA–FAC are catalysts according to the present invention while FAD–FAH are comparisons and the one designated as FAI is the conventional catalyst.

along with the chemical compositions. It is found that the catalyst according to the present invention improves its catalytic activity remarkably.

TABLE 45

| catalysts | carrier | NiO (%) | P₂O₅ (%) | MoO₃ (%) | relative value of rate constant (RVA) |
|---|---|---|---|---|---|
| FAA | P | 4 | 6 | 18 | 193 |
| FAB | P | 4 | 6 | 18 | 184 |
| FAC | Q | 4 | 6 | 18 | 200 |
| FAD | R | 4 | 6 | 18 | 143 |
| FAE | S | 4 | 6 | 18 | 145 |
| FAF | T | 4 | 6 | 18 | 122 |
| FAG | P | 4 | 6 | 18 | 100 |
| FAH | P | 4 | 6 | 18 | 134 |
| FAI | P | 4 | 6 | 18 | 100 |

Example 29

(1) Preparation of the γ alumina carrier substances

The γ alumina carrier substances were prepared using similar procedures as in example 1.

(2) Preparation of the hydrodenitrogenation catalysts

Using the γ alumina carrier substances, catalysts FBA–FBI were prepared under conditions listed in Table 46 using the malt sugar as an additive agent. In Table 46, catalysts FBA–FBC are catalysts according to the present

TABLE 44

| catalysts | carrier | cobalt carbonate (g) | 85% phosphoric acid (g) | molybdenum trioxide (g) | grape sugar (mol equivalent*) | liquid amount (ml) | drying temp. (°C.) | drying time (hr) | calcination temp. (°C.) | calcination time (hr) |
|---|---|---|---|---|---|---|---|---|---|---|
| FAA | P | 106 | 133 | 253 | 0.1 | 900 | 100 | 16 | — | — |
| FAB | P | 106 | 133 | 253 | 0.5 | 900 | 100 | 16 | — | — |
| FAC | Q | 106 | 133 | 253 | 0.5 | 900 | 100 | 16 | — | — |
| FAD | R | 106 | 133 | 253 | 0.5 | 900 | 100 | 16 | — | — |
| FAE | S | 106 | 133 | 253 | 0.5 | 910 | 100 | 16 | — | — |
| FAF | T | 106 | 133 | 253 | 0.5 | 950 | 100 | 16 | — | — |
| FAG | P | 106 | 133 | 253 | 0.5 | 960 | 100 | 16 | 500 | 2 |
| FAH | P | 106 | 133 | 253 | 0 | 900 | 100 | 16 | — | — |
| FAI | P | 106 | 133 | 253 | 0 | 900 | 100 | 16 | 500 | 2 |

*: molar ratio of additives to total mole of active metal elements (3) Presulfurization treatments Each catalyst prepared through the above (2) process was presulfurized in a similar manner as an example 1. No nickel carbonyl was detected in the decomposition product.

(4) Hydrodenitrogenation tests

Using the presulfurized catalysts, each catalyst was subjected to the hydrodenitrogenation tests to evaluate the catalytic activity. The results obtained are listed in Table 45 invention while FBD–FBH are comparisons and the one designated as FBI is a conventional catalyst.

TABLE 46

| catalysts | carrier | nickel carbonate (g) | 85% phosphoric acid (g) | molybdenum trioxide (g) | malt sugar (mol equivalent*) | liquid amount (ml) | drying temp. (°C.) | drying time (hr) | calcination temp. (°C.) | calcination time (hr) |
|---|---|---|---|---|---|---|---|---|---|---|
| FBA | P | 106 | 133 | 253 | 0.1 | 900 | 100 | 16 | — | — |
| FBB | P | 106 | 133 | 253 | 0.5 | 900 | 100 | 16 | — | — |
| FBC | Q | 106 | 133 | 253 | 0.5 | 900 | 100 | 16 | — | — |
| FBD | R | 106 | 133 | 253 | 0.5 | 900 | 100 | 16 | — | — |
| FBE | S | 106 | 133 | 253 | 0.5 | 910 | 100 | 16 | — | — |

TABLE 46-continued

| catalysts | carrier | nickel carbonate (g) | 85% phosphoric acid (g) | molybdenum trioxide (g) | malt sugar (mol equivalent*) | liquid amount (ml) | drying temp. (°C.) | drying time (hr) | calcination temp. (°C.) | calcination time (hr) |
|---|---|---|---|---|---|---|---|---|---|---|
| FBF | T | 106 | 133 | 253 | 0.5 | 950 | 100 | 16 | — | — |
| FBG | P | 106 | 133 | 253 | 0.5 | 960 | 100 | 16 | 500 | 2 |
| FBH | P | 106 | 133 | 253 | 0 | 900 | 100 | 16 | — | — |
| FBI | P | 106 | 133 | 253 | 0 | 900 | 100 | 16 | 500 | 2 |

*: molar ratio of additives to total mole of active metal elements (3) Presulfurization treatment Using the prepared catalyst through the above (2) procedure, each catalyst was presulfurized under a similar manner as in example 1. No nickel carbonyl was detected from the decomposition product during the presulfurization treatment.

(4) Hydrodenitrogenation tests

Using the presulfurized catalysts, each catalyst was subjected to the hydrodenitrogenation tests to evaluate the catalytic activities. The obtained data along with the chemical compositions are listed in Table 47. It is found that the catalysts according to the present invention enhance the catalytic activities remarkably.

TABLE 47

| catalysts | carrier | NiO (%) | P₂O₅ (%) | MoO₃ (%) | relative value of rate constant (RVA) |
|---|---|---|---|---|---|
| FBA | P | 4 | 6 | 18 | 193 |
| FBB | P | 4 | 6 | 18 | 184 |
| FBC | Q | 4 | 6 | 18 | 200 |
| FBD | R | 4 | 6 | 18 | 143 |
| FBE | S | 4 | 6 | 18 | 145 |
| FBF | T | 4 | 6 | 18 | 122 |
| FBG | P | 4 | 6 | 18 | 100 |
| FBH | P | 4 | 6 | 18 | 134 |
| FBI | P | 4 | 6 | 18 | 100 |

Example 30

(1) Preparation of the γ alumina carrier substances

Similarly as in example 1, the γ alumina carrier substances were prepared.

(2) Preparation of the hydrodenitrogenation catalysts

Using the γ alumina carrier substances prepared through the above (1) procedure, catalysts FCA–FCI were prepared under the conditions listed in Table 48 using the milk sugar as an additive agent. Catalysts FCA–FCC are catalysts according to the present invention, FCD–FCH are comparisons, and the one designated as FCI is the conventional type of catalyst.

TABLE 48

| catalysts | carrier | nickel carbonate (g) | 85% phosphoric acid (g) | molybdenum trioxide (g) | milk sugar (mol equivalent*) | liquid amount (ml) | drying temp. (°C.) | drying time (hr) | calcination temp. (°C.) | calcination time (hr) |
|---|---|---|---|---|---|---|---|---|---|---|
| FCA | P | 106 | 133 | 253 | 0.1 | 900 | 100 | 16 | — | — |
| FCB | P | 106 | 133 | 253 | 0.5 | 900 | 100 | 16 | — | — |
| FCC | Q | 106 | 133 | 253 | 0.5 | 900 | 100 | 16 | — | — |
| FCD | R | 106 | 133 | 253 | 0.5 | 900 | 100 | 16 | — | — |
| FCE | S | 106 | 133 | 253 | 0.5 | 910 | 100 | 16 | — | — |
| FCF | T | 106 | 133 | 253 | 0.5 | 950 | 100 | 16 | — | — |
| FCG | P | 106 | 133 | 253 | 0.5 | 960 | 100 | 16 | 500 | 2 |
| FCH | P | 106 | 133 | 253 | 0 | 900 | 100 | 16 | — | — |
| FCI | P | 106 | 133 | 253 | 0 | 900 | 100 | 16 | 500 | 2 |

*: molar ratio of additives to total mole of active metal elements (3) Presulfurization treatment Similarly as in example 1, catalysts prepared through the above (2) procedure were presulfurized. No nickel carbonyl was detected in the decomposition product during the presulfurization treatment.

(4) Hydrodenitrogenation tests

Using the presulfurized catalysts, each catalyst was subjected to the hydrodenitrogenation tests to evaluate the catalytic activities. The obtained data along with the chemical compositions are listed in Table 49. It was found that the catalyst according to the present invention exhibits significant improvement in catalytic activities.

TABLE 49

| catalysts | carrier | NiO (%) | P₂O₅ (%) | MoO₃ (%) | relative value of rate constant (RVA) |
|---|---|---|---|---|---|
| FCA | P | 4 | 6 | 18 | 194 |
| FCB | P | 4 | 6 | 18 | 187 |
| FCC | Q | 4 | 6 | 18 | 203 |
| FCD | R | 4 | 6 | 18 | 147 |
| FCE | S | 4 | 6 | 18 | 146 |
| FCF | T | 4 | 6 | 18 | 123 |
| FCG | P | 4 | 6 | 18 | 100 |
| FCH | P | 4 | 6 | 18 | 135 |
| FCI | P | 4 | 6 | 18 | 100 |

7. Examples in which hydrodesulfurization is performed when sugar groups within the amount defined in the present invention with respect to the supported active metal element was utilized (Example 31–Example 33)

Example 31

(1) Preparation of the hydrodesulfurization catalysts

Using the aforementioned γ alumina carrier substance P, catalysts GAA–GAG were prepared under the conditions listed in Table 50 using the grape sugar as an additive agent.

Example 32

(1) Preparation of the hydrodesulfurization catalysts

TABLE 50

| Catalysts | Cobalt Carbonate (g) | 85% Phosphoric Acid (g) | Molyodenum Trioxide (g) | grape sugar (mol equivalent*) | Liquid Amount (ml) | DRYING Temp. (°C.) | DRYING Time (hr) | CALCINATION Temp. (°C.) | CALCINATION Time (hr) |
|---|---|---|---|---|---|---|---|---|---|
| GAA | 85 | 64 | 242 | 0.0 | 900 | 100 | 16 | — | — |
| GAB | 85 | 64 | 242 | 0.05 | 900 | 100 | 16 | — | — |
| GAC | 85 | 64 | 242 | 0.2 | 900 | 100 | 16 | — | — |
| GAD | 85 | 64 | 242 | 0.5 | 900 | 100 | 16 | — | — |
| GAE | 85 | 64 | 242 | 1.0 | 910 | 100 | 16 | — | — |
| GAF | 85 | 64 | 242 | 0.5 | 900 | 100 | 16 | 500 | 2 |
| GAG | 85 | 64 | 242 | 1.0 | 900 | 100 | 16 | 500 | 2 |

*: molar ratio of additives to total mole of active metal elements

Catalysts GAB–GAE are catalysts according to the present invention, while GAA and GAF are comparisons, and the one given the designation of GAG is the conventional type of catalyst.

(2) Presulfurization treatment

Each catalyst prepared through the above (1) procedure was presulfurized under the similar way as in example 1. No cobalt carbonyl was detected in the decomposition product which was produced during the presulfurization treatment.

(3) Hydrodesulfurization tests

Using the presulfurized catalysts, each catalyst was subjected to the hydrodesulfurization tests to evaluate the catalytic activities. The results are listed in Table 51 along with the chemical compositions.

It was found that the catalysts according to the present invention show great enhancement in catalytic activities.

TABLE 51

| Catalysts | CoO (%) | $P_2O_5$ (%) | $MoO_3$ (%) | relative value of rate constant (RVA) |
|---|---|---|---|---|
| GAA | 4 | 3 | 18 | 177 |
| GAB | 4 | 3 | 18 | 206 |
| GAC | 4 | 3 | 18 | 226 |
| GAD | 4 | 3 | 18 | 220 |
| GAE | 4 | 3 | 18 | 208 |
| GAF | 4 | 3 | 18 | 101 |
| GAG | 4 | 3 | 18 | 100 |

Using malt sugar as an additive agent, catalysts GBA–GBG were prepared under the conditions listed in Table 52 in a similar manner as in example 31. Catalysts GBB–GBE are catalysts according to the present invention while GBA and GBF are comparisons and the one designated as GBG is the conventional type of catalyst.

TABLE 52

| Catalysts | Cobalt Carbonate (g) | 85% Phosphoric Acid (g) | Molybdenum Trioxide (g) | malt sugar (mol equivalent*) | Liquid Amount (ml) | DRYING Temp. (°C.) | DRYING Time (hr) | CALCINATION Temp. (°C.) | CALCINATION Time (hr) |
|---|---|---|---|---|---|---|---|---|---|
| GBA | 85 | 64 | 242 | 0.0 | 900 | 100 | 16 | — | — |
| GBB | 85 | 64 | 242 | 0.05 | 900 | 100 | 16 | — | — |
| GBC | 85 | 64 | 242 | 0.1 | 900 | 100 | 16 | — | — |
| GBD | 85 | 64 | 242 | 0.2 | 900 | 100 | 16 | — | — |
| GBE | 85 | 64 | 242 | 0.5 | 910 | 100 | 16 | — | — |
| GBF | 85 | 64 | 242 | 0.5 | 900 | 100 | 16 | 500 | 2 |
| GBG | 85 | 64 | 242 | 0.0 | 900 | 100 | 16 | 500 | 2 |

*: molar ratio of additives to total mole of active metal elements (2) Presulfurization treatment Each catalyst prepared in the above (1) step was presulfurized in a similar manner as example 1. No cobalt carbonyl was detected in the decomposition product.

(3) Hydrodesulfurization tests

Using the presulfurized catalysts, each catalyst was subjected to the hydrodesulfurization tests to examine the catalytic activities. The obtained results are listed in Table 53 along with the chemical compositions. It is found that the catalysts according to the present invention show a remarkable improvement regarding the activities of the catalyst.

TABLE 53

| Catalysts | CoO (%) | $P_2O_5$ (%) | $MoO_3$ (%) | relative value of rate constant (RVA) |
|---|---|---|---|---|
| GBA | 4 | 3 | 18 | 174 |
| GBB | 4 | 3 | 18 | 202 |
| GBC | 4 | 3 | 18 | 220 |
| GBD | 4 | 3 | 18 | 215 |
| GBE | 4 | 3 | 18 | 204 |
| GBF | 4 | 3 | 18 | 100 |
| GBG | 4 | 3 | 18 | 100 |

Example 33

(1) Preparation of the hydrodesulfurization catalysts

Using the milk sugar as an additive agent, catalysts GCA–GCG were prepared under the conditions listed in Table 54. Catalysts GCB–GCE are catalysts according to the present invention while GCA and GCF are comparisons, and the designation GCG is for the conventional type of catalyst.

(2) Presulfurization treatment

Each catalyst was presulfurized under a similar manner as in example 1. No cobalt carbonyl was detected in the decomposition product during the presulfurization treatment.

present invention with respect to the supported active metal elements are utilized (Example 34–Example 38)

Example 34

(1) Preparation of the hydrodenitrogenation catalysts

Using the aforementioned γ alumina carrier substances P, catalysts HAA–HAG were prepared under the conditions listed in Table 56 using the grape sugar as an additive agent. In Table 56, catalysts HAB–HAE are catalysts according to the present invention while HAA and HAF are comparisons, and catalyst HAG is the conventional type of catalyst.

TABLE 54

| catalysts | cobalt carbonate (g) | 85% phosphoric acid (g) | molybdenum trioxide (g) | milk sugar (mol equivalent*) | liquid amount (ml) | drying temp. (°C.) | drying time (hr) | calcination temp. (°C.) | calcination time (hr) |
|---|---|---|---|---|---|---|---|---|---|
| GCA | 85 | 64 | 242 | 0.0 | 900 | 100 | 16 | — | — |
| GCB | 85 | 64 | 242 | 0.05 | 900 | 100 | 16 | — | — |
| GCC | 85 | 64 | 242 | 0.1 | 900 | 100 | 16 | — | — |
| GCD | 85 | 64 | 242 | 0.2 | 900 | 100 | 16 | — | — |
| GCE | 85 | 64 | 242 | 0.5 | 910 | 100 | 16 | — | — |
| GCF | 85 | 64 | 242 | 0.5 | 900 | 100 | 16 | 500 | 2 |
| GCG | 85 | 64 | 242 | 0.0 | 900 | 100 | 16 | 500 | 2 |

*: molar ratio of additives to total mole of active metal elements (3) Hydrodesulfurization tests Using the presulfurized catalysts, each catalyst was subjected to the hydrodesulfurization tests to evaluate the catalytic activity. The obtained results along with the chemical compositions are listed in Table 55. It was found that the catalysts according to the present invention show significant enhancement in catalytic activities, when compared with other types of catalysts.

TABLE 56

| catalysts | nickel carbonate (g) | 85% phosphoric acid (g) | molybdenum trioxide (g) | grape sugar (mol equivalent*) | liquid amount (ml) | drying temp. (°C.) | drying time (hr) | calcination temp. (°C.) | calcination time (hr) |
|---|---|---|---|---|---|---|---|---|---|
| HAA | 106 | 133 | 253 | 0.0 | 900 | 100 | 16 | — | — |
| HAB | 106 | 133 | 253 | 0.05 | 900 | 100 | 16 | — | — |
| HAC | 106 | 133 | 253 | 0.2 | 900 | 100 | 16 | — | — |
| HAD | 106 | 133 | 253 | 0.5 | 900 | 100 | 16 | — | — |
| HAE | 106 | 133 | 253 | 1.0 | 910 | 100 | 16 | — | — |
| HAF | 106 | 133 | 253 | 0.5 | 900 | 100 | 16 | 500 | 2 |
| HAG | 106 | 133 | 253 | 0.0 | 900 | 100 | 16 | 500 | 2 |

*: molar ratio of additives to total mole of active metal elements

TABLE 55

| Catalysts | CoO (%) | $P_2O_5$ (%) | $MoO_3$ (%) | relative value of rate constant (RVA) |
|---|---|---|---|---|
| GCA | 4 | 3 | 18 | 174 |
| GCB | 4 | 3 | 18 | 204 |
| GCC | 4 | 3 | 18 | 223 |
| GCD | 4 | 3 | 18 | 219 |
| GCE | 4 | 3 | 18 | 206 |
| GCF | 4 | 3 | 18 | 100 |
| GCG | 4 | 3 | 18 | 100 |

8. Examples in which the hydrodenitrogenation is performed when the sugar groups within the defined amount in the (3) Presulfurization treatment Each catalyst was presulfurized according to a similar procedure as in example 1. No nickel carbonyl was detected from the decomposition product during the presulfurization process.

(3) Hydrodenitrogenation tests

Using presulfurized catalysts, each catalyst was subjected to the hydrodenitrogenation tests to evaluate the catalytic activities. The data obtained and chemical compositions are listed in Table 57. It was found that the catalyst according to the present invention exhibits remarkable improvement in catalytic activities.

TABLE 57

| Catalysts | NiO (%) | P₂O₅ (%) | MoO₃ (%) | relative value of rate constant (RVA) |
|---|---|---|---|---|
| HAA | 4 | 6 | 18 | 148 |
| HAB | 4 | 6 | 18 | 176 |
| HAC | 4 | 6 | 18 | 193 |
| HAD | 4 | 6 | 18 | 183 |
| HAE | 4 | 6 | 18 | 177 |
| HAF | 4 | 6 | 18 | 101 |
| HAG | 4 | 6 | 18 | 100 |

Example 35

(1) Preparation of the hydrodenitrogenation catalysts

Using the malt sugar as an additive agent, catalysts HBA–HBG were prepared under conditions listed in Table 58 in a similar manner as in example 34. Catalysts HBB–HBE are catalysts according to the present invention while HBA–HBF are comparisons and HBG is the conventional catalyst.

(2) Presulfurization treatment

Each of the catalysts was presulfurized in a similar manner as in example 1. No nickel carbonyl was detected from the decomposition product.

(3) Hydrodenitrogenation tests

The presulfurized catalyst was subjected to the hydrodenitrogenation tests to evaluate the catalytic activities. The results obtained are listed in Table 59. It was found that the catalysts according to the present invention exhibit remarkable improvement in the catalytic activities.

TABLE 59-continued

| Catalysts | NiO (%) | P₂O₅ (%) | MoO₃ (%) | Relative Value Of Rate Constant (RVA) |
|---|---|---|---|---|
| HBG | 4 | 6 | 18 | 100 |

Example 36

(1) Preparation of the hydrodenitrogenation catalysts

Using the milk sugar as an additive agent, catalysts HCA–HCG were prepared under the conditions listed in Table 60 with in a similar manner as in example 34. Catalysts HCB–HCE are catalysts according to the present invention, while HCA and HCF are comparisons and HCG is the conventional catalyst.

(2) Presulfurization treatment

Each catalyst prepared through the above (1) procedure was presulfurized. It was found that no nickel carbonyl was detected from the decomposition product which was produced during the presulfurization treatment.

TABLE 58

| catalysts | nickel carbonate (g) | 85% phosphoric acid (g) | molybdenum trioxide (g) | malt sugar (mol equivalent*) | liquid amount (ml) | drying temp. (°C.) | drying time (hr) | calcination temp. (°C.) | calcination time (hr) |
|---|---|---|---|---|---|---|---|---|---|
| HBA | 106 | 133 | 253 | 0.0 | 900 | 100 | 16 | — | — |
| HBB | 106 | 133 | 253 | 0.05 | 900 | 100 | 16 | — | — |
| HBC | 106 | 133 | 253 | 0.1 | 900 | 100 | 16 | — | — |
| HBD | 106 | 133 | 253 | 0.2 | 900 | 100 | 16 | — | — |
| HBE | 106 | 133 | 253 | 0.5 | 910 | 100 | 16 | — | — |
| HBF | 106 | 133 | 253 | 0.5 | 900 | 100 | 16 | 500 | 2 |
| HBG | 106 | 133 | 253 | 0.0 | 900 | 100 | 16 | 500 | 2 |

*: molar ratio of additives to total mole of active metal elements

TABLE 59

| Catalysts | NiO (%) | P₂O₅ (%) | MoO₃ (%) | Relative Value Of Rate Constant (RVA) |
|---|---|---|---|---|
| HBA | 4 | 6 | 18 | 148 |
| HBB | 4 | 6 | 18 | 174 |
| HBC | 4 | 6 | 18 | 193 |
| HBD | 4 | 6 | 18 | 182 |
| HBE | 4 | 6 | 18 | 175 |
| HBF | 4 | 6 | 18 | 101 |

TABLE 60

| catalysts | nickel carbonate (g) | 85% phosphoric acid (g) | molybdenum trioxide (g) | milk sugar (mol equivalent*) | liquid amount (ml) | drying temp. (°C.) | drying time (hr) | calcination temp. (°C.) | calcination time (hr) |
|---|---|---|---|---|---|---|---|---|---|
| HCA | 106 | 133 | 253 | 0.0 | 900 | 100 | 16 | — | — |

TABLE 60-continued

| catalysts | nickel carbonate (g) | 85% phosphoric acid (g) | molybdenum trioxide (g) | milk sugar (mol equivalent*) | liquid amount (ml) | drying temp. (°C.) | drying time (hr) | calcination temp. (°C.) | calcination time (hr) |
|---|---|---|---|---|---|---|---|---|---|
| HCB | 106 | 133 | 253 | 0.05 | 900 | 100 | 16 | — | — |
| HCC | 106 | 133 | 253 | 0.1 | 900 | 100 | 16 | — | — |
| HCD | 106 | 133 | 253 | 0.2 | 900 | 100 | 16 | — | — |
| HCE | 106 | 133 | 253 | 0.5 | 910 | 100 | 16 | — | — |
| HCF | 106 | 133 | 253 | 0.5 | 900 | 100 | 16 | 500 | 2 |
| HCG | 106 | 133 | 253 | 0.0 | 900 | 100 | 16 | 500 | 2 |

*: molar ratio of additives to total mole of active metal elements (3) Hydrodenitrogenation tests Using the same catalyst employed for the presulfurization treatments, each catalyst was subjected to the hydrodenitrogenation tests under a similar manner as example 8. The data obtained and chemical compositions are listed in Table 61. It was found that the catalysts according to the present invention exhibit remarkable improvement in catalytic activities.

TABLE 61

| Catalysts | NiO (%) | $P_2O_5$ (%) | $MoO_3$ (%) | relative value of rate constant (RVA) |
|---|---|---|---|---|
| HCA | 4 | 6 | 18 | 145 |
| HCB | 4 | 6 | 18 | 175 |
| HCC | 4 | 6 | 18 | 193 |
| HCD | 4 | 6 | 18 | 182 |
| HCE | 4 | 6 | 18 | 174 |
| HCF | 4 | 6 | 18 | 100 |
| HCG | 4 | 6 | 18 | 100 |

Example 37

(1) Preparation of the γ alumina carrier substances

The γ alumina carrier substances P, Q, R, S and T are prepared with a similar method as employed for example 1.

(2) Preparation of the hydrodesulfurization catalysts

Catalysts AAA"–AAI" were prepared according to Table 2 for example 1.

(3) Presulfurization treatment

Each catalyst was presulfurized in a similar manner as in example 1.

(4) Hydrodesulfurization tests

The hydrodesulfurization tests were conducted on presulfurized catalysts under similar conditions as in example 1 except for the following: (i) feed oil was Kuwait vacuum gas oil (VGO) with 2.87% of sulfur and 827 ppm of nitrogen, (ii) the reaction temperature was 365° C., (iii) the hydrogen pressure was 40 kg/cm²G, and (iv) the hydrogen/liquid ratio was 600 Nl/l.

The hydrodesulfurization performance for each catalyst, when it is indicated as a relative value of the reaction rate constant, was found to be approximately the same as those which are listed in Table 3.

Example 38

(1) Preparation of the γ alumina carrier substances

Similarly as example 1, carrier substances P, Q, R, S and T having the same characteristics as shown in Table 1 were prepared.

(2) Preparation of the hydrodenitrogenation catalysts

According to Table 13 for the example 8, catalysts BAA"–BAI" were prepared for hydrodenitrogenation tests.

(3) Presulfurization treatments

Each catalyst was presulfurized under a similar manner as in example 8.

(4) Hydrodenitrogenation tests

The hydrodenitrogenation tests were conducted on presulfurized catalysts under conditions similar to those mentioned in case of example 8 except for the following (i) feed oil was Kuwait reduced pressure light oil (VGO) with 2.87% of sulfur and 827 ppm of nitrogen, (ii) the reaction temperature was 365° C., (iii) the hydrogen pressure was 40 kg/cm²G, and (iv) the hydrogen/liquid ratio was 600 Nl/l.

The denitrogenation performance for each catalyst, when it is indicated as a relative value of the rate constant, was found to be approximately the same as those listed in Table 14.

As described in details, the catalysts according to the present invention possess higher activities for hydrodesulfurization and hydrodenitrogenation than those prepared by the conventional methods. The method for preparing the catalysts is also simple and easy.

While this invention has been described in detail with reference to preferred examples and methods disclosed herein, it should be understood that this invention is not limited to previously mentioned precise examples; rather many modifications and variations would present themselves to those of skill in the art without departing from the scope and spirit of this invention as defined in the appended claims.

What is claimed is:

1. A catalyst for hydrotreating hydrocarbon oils, comprising an impregnated alumina carrier substance having a porous surface, wherein said catalyst has been prepared by a process consisting of the steps of simultaneously impregnating an alumina carrier substance with components in a mixture to form an impregnated substance, and then drying said impregnated substance at a temperature of less than 200° C. such that supported active metal salts on said impregnated substance are not decomposed to form oxides, wherein said components in said mixture comprise: at least one active metal element selected from the Group VI metals in the periodic table; at least one active metal element selected from the Group VIII metals in the periodic table; phosphoric acid; and an additive agent, wherein said additive agent exhibits lower coordinate ability than alcoxycarboxylic acid and is at least one substance selected from the group consisting of dihydric or trihydric alcohols having 2–10 carbon atoms per one molecule, ethers of said alcohols, monosaccharides, disaccharides and polysaccharides, and wherein both said active metals and said at least one additive are dispersed and adsorbed on the surface of said alumina carrier substance and remain at fixed sites during drying so as to suppress aggregation of active metals when employed in a subsequent presulfurization process, and wherein said temperature is such that moisture is removed from said impregnated substance but decomposition and evaporation of the adsorbed additive is prevented.

2. The hydrotreating catalyst for hydrocarbon oils as claimed in claim 1, wherein said alumina carrier substance is a γ alumina which has 70–120 Angstrom of average pore diameter measured by the mercury porosimetry technique and 60% of the total pore volume is occupied by pores having pore diameters within an average pore diameter range of ± 10 Angstrom.

3. A catalyst for hydrotreating hydrocarbon oils, comprising an impregnated alumina carrier substance having a porous surface, wherein said catalyst has been prepared by a process consisting of the steps of simultaneously impregnating an alumina carrier substance with components in a mixture to form an impregnated substance, and then drying said impregnated substance at a drying temperature, wherein said components in said mixture comprise: at least one active metal element selected from the Group VI metals in the periodic table; at least one active metal element selected from the Group VIII metals in the periodic table; phosphoric acid; and an additive agent, wherein said additive agent is selected from the group consisting of ethylene glycol, propylene glycol, diethylene glycol, trimethylene glycol, triethylene glycol, ethylene glycol monobutyl ether, diethylene glycol monomethyl ether, diethylene glycol monoethyl ether, diethylene glycol monopropyl ether, diethylene glycol monobutyl ether, glycerine, trimethylol ethane and trimethylol propane, and wherein both said active metals and said at least one additive are dispersed and adsorbed on the surface of said alumina carrier substance and remain at fixed sites during drying so as to suppress aggregation of active metals when employed in a subsequent presulfurization process, and wherein said temperature is such that moisture is removed from said impregnated substance but decomposition and evaporation of the adsorbed additive is prevented.

4. A catalyst for hydrotreating hydrocarbon oils, comprising an impregnated alumina carrier substance having a porous surface, wherein said catalyst has been prepared by a process consisting of the steps simultaneously impregnating an alumina carrier substance with components in a mixture to form an impregnated substance, and then drying said impregnated substance at a drying temperature, wherein said components in said mixture comprise: at least one active metal element selected from the Group VI metals in the periodic table; at least one active metal element selected from the Group VIII metals in the periodic table; phosphoric acid; and an additive agent, wherein said additive agent comprises at least one member selected from the group consisting of grape sugar (glucose: $C_6H_{12}O_6$), fruit sugar (fructose: $C_6H_{12}O_6$), malt sugar (maltose: $C_{12}H_{22}O_{11}$), milk sugar (lactose: $C_{12}H_{22}O_{11}$), and cane sugar (sucrose: $C_{12}H_{22}O_{11}$), and wherein both said active metals and said at least one additive are dispersed and adsorbed on the surface of said alumina carrier substance and remain at fixed sites during drying so as to suppress aggregation of active metals when employed in a subsequent presulfurization process, and wherein said temperature is such that moisture is removed from said impregnated substance but decomposition and evaporation of the adsorbed additive is prevented.

5. A catalyst for hydrotreating hydrocarbon oils, comprising an impregnated alumina carrier substance having a porous surface, wherein said catalyst has been prepared by a process consisting of the steps of simultaneously impregnating an alumina carrier substance with components in a mixture to form an impregnated substance, and then drying said impregnated substance at a temperature of less than 200° C. such that supported active metal salts on said impregnated substance are not decomposed to form oxides, wherein said components in said mixture comprise: at least one active metal element selected from the Group VI metals in the periodic table; at least active metal element selected from the Group VIII metals in the periodic table; phosphoric acid; and an additive agent which exhibits lower coordinate ability than alcoxycarboxylic acid and is selected from the group consisting of dihydric or trihydric alcohols having 2–10 carbon atoms per one molecule, and ethers of said alcohols, wherein the amount of said additive agent is in the order of 0.05–3 fold of the total number of moles of the supported active metal elements, and wherein both said active metals and said at least one additive are dispersed and adsorbed on the surface of said alumina carrier substance and remain at fixed sites during drying so as to suppress aggregation of active metals when employed in a subsequent presulfurization process, and wherein said temperature is such that moisture is removed from said impregnated substance but decomposition and evaporation of the adsorbed additive is prevented.

6. A catalyst for hydrotreating hydrocarbon oils, comprising an impregnated alumina carrier substance having a porous surface, wherein said catalyst has been prepared by a process consisting of the steps of simultaneously impregnating an alumina carrier substance with components in a mixture to form an impregnated substance, and then drying said impregnated substance at a drying temperature, wherein said components in said mixture comprise: at least one active metal element selected from the Group VI metals in the periodic table; at least one active metal element selected from the Group VIII metals in the periodic table; phosphoric acid; and an additive agent selected from the group consisting of ethylene glycol, propylene glycol, diethylene glycol, trimethylene glycol, triethylene glycol, ethylene glycol monobutyl ether, diethylene glycol monomethyl ether, diethylene glycol monoethyl ether, diethylene glycol monopropyl ether, diethylene glycol monobutyl ether, glycerine, trimethylol ethane and trimethylol propane, wherein the amount of said additive agent is in the order of 0.05–3 fold of the total number of moles of the supported active metal elements, and wherein both said active metals and said at least one additive are dispersed and adsorbed on the surface of said alumina carrier substance and remain at fixed sites during drying so as to suppress aggregation of active metals when employed in a subsequent presulfurization process, and wherein said temperature is such that moisture is removed from said impregnated substance but decomposition and evaporation of the adsorbed additive is prevented.

7. The hydrotreating catalyst for hydrocarbon oils as claimed in claim 5, wherein a supported amount of at least one active metal element selected from the Group VI metals in the periodic table is present in an amount in the range of 10–30% equivalent weight of oxide converted weight of said catalyst, a supported amount of at least one active metal element chosen from the Group VIII metals in the periodic table is present in an amount in the range of 1–8% equivalent weight of oxide converted weight of said catalyst, and a supported amount of phosphoric acid is present in an amount in the range of 1–10% equivalent weight of $P_2O_5$ converted weight of the catalyst.

8. A catalyst for hydrotreating hydrocarbon oils, comprising an impregnated alumina carrier substance having a porous surface, wherein said catalyst has been prepared by a process consisting of the steps of simultaneously impregnating an alumina carrier substance with components in a mixture to form an impregnated substance, and then drying said impregnated substance at a temperature of less than 200° C. such that supported active metal salts on said impregnated substance are not decomposed to form oxides, wherein said components in said mixture comprise: at least one active metal element selected from the Group VI metals in the periodic table; at least active metal element selected from the Group VIII metals in the periodic table; phosphoric acid; and an additive agent which exhibits lower coordinate ability than alcoxycarboxylic acid and is at least one substance selected from the group consisting of monosaccharides, disaccharides and polysaccharides, wherein the amount of said additive agent is in the order of 0.05–1 fold of the total number of moles of supported active metal elements, and wherein both said active metals and said at least one additive are dispersed and adsorbed on the surface of said alumina carrier substance and remain at fixed sites during drying so as to suppress aggregation of active metals when employed in a subsequent presulfurization process, and wherein said temperature is such that moisture is removed from said impregnated substance but decomposition and evaporation of the adsorbed additive is prevented.

9. The hydrotreating catalyst for hydrocarbon oils as claimed in claim 8, wherein said additive agent comprises at least one substance selected from the group consisting of grape sugar, fruit sugar, malt sugar, milk sugar, and cane sugar.

10. The hydrotreating catalyst for hydrocarbon oils as claimed in claim 8, wherein a supported amount of at least one active metal element selected from the Group VI metals in the periodic table is present in an amount within the range of 10–30% equivalent weight of oxide converted weight of said catalyst, a supported amount of at least one active metal element chosen from the Group VIII metals in the periodic table present in an amount within the range of 1–8% equivalent weight of oxide converted weight of said catalyst, and a supported amount of phosphoric acid is present in an amount within the range of 1–10% equivalent weight of $P_2O_5$ converted weight of the catalyst.

11. A method for preparing a hydrotreating catalyst for hydrocarbon oils consisting of the steps of:

simultaneously impregnating an alumina carrier substance having a porous surface with a solution comprising: at least one active metal element selected from the Group VI metals in the periodic table; at least one active metal element selected from the Group VIII metals in the periodic table; phosphoric acid; and at least one additive selected from the group consisting of dihydric and trihydric alcohols having 2–10 carbon atoms per one molecule, ethers of said alcohols, monosaccharides, disaccharides, and polysaccharides, to form an impregnated carrier substance containing supported active metals and said at least one additive; and drying said impregnated carrier substance at a temperature of less than 200° C. at which moisture content is removed but said active metal salts are not decomposed to form oxides, wherein both said active metals and said at least one additive are dispersed and adsorbed on the porous surface of said alumina carrier substance and are fixed at sites during drying to suppress aggregation of active metals during subsequent presulfurization.

12. The method for preparing a hydrotreating catalyst for hydrocarbon oils as claimed in claim 11, wherein said alumina carrier substance is a γ alumina which has an average pore diameter of 70–120 Angstrom measured by the mercury porosimetry technique and 60% of the total pore volume is occupied by pores having pore diameters within an average pore diameter range of ± 10 Angstrom.

13. The method for preparing a hydrotreating catalyst for hydrocarbon oils as claimed in claim 11, wherein said additive agent is at least one substance selected from the group consisting of ethylene glycol, propylene glycol, diethylene glycol, trimethylene glycol, triethylene glycol, ethylene glycol monobutyl ether, diethylene glycol monomethyl ether, diethylene glycol monoethyl ether, diethylene glycol monopropyl ether, diethylene glycol monobutyl ether, glycerine, trimethylol ethane, and trimethylol propane.

14. The method for preparing a hydrotreating catalyst for hydrocarbon oils as claimed in claim 11, wherein said additive agent is at least one member selected from the group consisting of grape sugar (glucose: $C_6H_{12}O_6$), fruit sugar (fructose: $C_6H_{12}O_6$), malt sugar (maltose: $C_{12}H_{22}O_{11}$), milk sugar (lactose: $C_{12}H_{22}O_{11}$), and cane sugar (sucrose: $C_{12}H_{22}O_{11}$).

15. The hydrotreating catalyst as claimed in claim 1, wherein said additive agent is at least one substance selected from the group consisting of trihydric alcohols having 2–10 carbon atoms per one molecule, ethers of said alcohols, monosaccharides, disaccharides and polysaccharides.

16. The hydrotreating catalyst as claimed in claim 5, wherein said additive agent is at least one substance selected from the group consisting of trihydric alcohols having 2–10 carbon atoms per one molecule, and ethers of said alcohols.

17. The method as claimed in claim 11, wherein said additive agent is at least one substance selected from the group consisting of trihydric alcohols having 2–10 carbon atoms per one molecule, ethers of said alcohols, monosaccharides, disaccharides and polysaccharides.

18. The method defined in claim 11, wherein the drying is conducted in a vacuum and said temperature is below a temperature at which said supported active metals evaporate, below a temperature at which said at least one additive evaporates, and below a temperature at which said at least one additive decomposes.

19. The method defined in claim 11, wherein the drying is conducted in an inert gas atmosphere.

* * * * *